(12) United States Patent
Nashiki

(10) Patent No.: US 6,285,104 B1
(45) Date of Patent: *Sep. 4, 2001

(54) MOTOR WITH REDUCED TORQUE RIPPLE

(75) Inventor: Masayuki Nashiki, Niwa-gun (JP)

(73) Assignee: Okuma Corporation, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,008

(22) Filed: Apr. 26, 1999

(30) Foreign Application Priority Data

May 7, 1998 (JP) ................................. 10-124998

(51) Int. Cl.$^7$ ..................................... H02K 1/00
(52) U.S. Cl. ........................................ 310/184; 310/198
(58) Field of Search ................... 310/179, 180, 310/184, 195, 198, 199, 162, 163, 166, 168, 156

(56) References Cited

U.S. PATENT DOCUMENTS

| | | | | |
|---|---|---|---|---|
| 4,371,802 | * | 2/1983 | Morril | 310/166 |
| 4,692,646 | * | 9/1987 | Gotou | 310/184 |
| 4,700,097 | * | 10/1987 | Kawada et al. | 310/162 |
| 4,700,098 | * | 10/1987 | Kawashima | 310/186 |
| 4,733,113 | * | 3/1988 | Smith | 310/49 R |
| 4,751,415 | * | 6/1988 | Kitamori et al. | 310/156 |
| 4,751,416 | * | 6/1988 | Trok | 310/156 |
| 5,164,622 | * | 11/1992 | Kordik | 310/67 R |
| 5,233,253 | * | 8/1993 | Nishio et al. | 310/254 |
| 5,331,245 | * | 7/1994 | Burgbacher et al. | 310/186 |
| 5,723,931 | * | 3/1998 | Andrey | 310/179 |
| 5,793,139 | * | 8/1998 | Nashiki | 310/216 |
| 5,801,478 | * | 9/1998 | Nashiki | 310/261 |
| 5,811,905 | * | 9/1998 | Tang | 310/179 |
| 5,818,140 | * | 10/1998 | Vagati | 310/185 |
| 5,838,087 | * | 11/1998 | Tang | 310/168 |
| 5,866,964 | * | 2/1999 | Li | 310/198 |
| 5,893,205 | * | 4/1999 | McClelland | 29/598 |
| 5,903,080 | * | 5/1999 | Nashiki et al. | 310/168 |
| 6,002,233 | * | 12/1999 | McCann | 318/701 |

FOREIGN PATENT DOCUMENTS

A-10-30218  2/1998 (JP) .

* cited by examiner

*Primary Examiner*—Elvin Enad
*Assistant Examiner*—Dang Dinh Le
(74) *Attorney, Agent, or Firm*—Oliff & Berridge, PLC.

(57) ABSTRACT

A motor is constructed such that the amplitude of a current phasor of each of the slots on a stator when three-phase sinusoidal current is applied to each phase of the motor in a permanent magnet synchronous motor and reluctance motor. The number of windings of each phase looped through each of the slots is determined such that a phase of each current phasor of each of the slots is coincident with a phase in terms of electrical degrees in a direction of rotor rotation of each of the slots. A center position of each magnetic pole of a rotor steel plate is shifted to the direction of rotor rotation by slot pitch/NRR, 2×slot pitch/NRR, 3×slot pitch/NRR, . . . , 1-slot pitch against a position divided equally into 360°/NRR, where NRR is the number of poles. The stator and the rotor are relatively skewed by the slot pitch/ NRR.

6 Claims, 20 Drawing Sheets

MOTOR WITH REDUCED TORQUE RIPPLE

BACKGROUND OF THE INVENTION

1. Field of the invention

The present invention relates to a common motor such as a synchronous motor of permanent magnet type, a synchronous reluctance motor, and an induction motor, and more particularly to technology for reducing torque ripple of such a motor.

2. Description of the Related Art

Many types of motors are now widely used for various industrial and consumer uses.

A motor shown in FIG. 17 is an example of a permanent magnet synchronous motor used in a servomechanism for controlling position, speed, or the like. Thirty-six slots numbered 1 to 36 as indicated are arranged on a stator 12. A line drawn at the midpoint of each of the slots represents a boundary between windings when two sets of windings are placed within each of the slots. On a rotor side, numeral 3 denotes a rotor axis, numeral 10 a rotor core, and numeral 11 a permanent magnet. Letters N and S described on the permanent magnets indicate magnetic north and south poles, respectively. In the example shown in this figure, the rotor is a six-pole rotor wherein a 1-magnetic-pole pitch is 60 degrees as shown in the figure. Such three-phase six-pole windings as depicted in a winding diagram of FIG. 2 are looped through each of the slots of the stator 12. The labels at the top of FIG. 2 are slot indicating numbers. Three sets of winding patterns from the slot 1 to the slot 12 are placed around the perimeter of the stator. U, V and W are alternating-current terminals and N is a neutral point when a star connection is applied. In FIG. 2, windings in each of the slots of only one-third of the entire model are illustrated for the sake of brief description. The one-third windings and remaining two-thirds windings of the slots are most commonly placed in series. FIG. 3 shows current phasor of each of the slots when a three-phase alternating current is applied to the windings in each of the slots. Currents in a direction of a 180-degree turn from currents passing through each of the terminals U. V, and W are represented by X, Y, and Z respectively. Marks (1), (2) etc. are the slot numbers. From FIG. 2 it can be seen that a U-phase current, for example, passes through the slot 1 and 2, and X-phase currents being of opposite phase to U-phase passes through the slot 7 and 8, and amplitude thereof is RR.

A winding method shown in a winding diagram of FIG. 4 is designated as short-pitch winding for the purpose of distributing current in each of the slots in a direction of rotor rotation, the distribution of which become more sinusoidal when a three-phase alternating current is applied and variations in the rotational direction of the rotor change more smoothly. To be more specific, windings in each of the slots are divided into two against the slots and half of the windings on each side are shifted to a counterclockwise direction CCW by 1-slot pitch. Solid and broken lines in FIG. 5 indicate current phasor of each of the slots when three-phase sinusoidal current is applied through providing sinusoidal current control to the current of the winding in each of the slots. For example, amplitude RS of current phasor of the windings in the slot 2 is the phasor sum UZS of U/2 and Z/2, and COS30°=0.866 as compared with the amplitude RR. Amplitude SS is equal to one half of the amplitude RR.

FIG. 18 shows an example of a conventional three-phase six-pole synchronous reluctance motor. A stator 12 corresponds to the stator of FIG. 17. Nine narrow magnetic paths 14 are placed at each magnetic pole and slits which interfere with conduction of magnetic flux are placed between each of the narrow magnetic paths 14 on the rotor 13. Jointing parts for a radial direction 15 hold each of the narrow magnetic paths 14 from a portion of the center of the rotor to prevent each of the narrow magnetic paths from being broken and divided by centrifugal force during rotation of the rotor. Jointing parts for a rotor perimeter 16 are placed on a part around the rotor perimeter to link the rotor perimeter. Such a synchronous reluctance motor operates as follows. A current magnetizing magnetic flux of the stator, a d-axis current, generates magnetic flux on the narrow magnetic paths 14 in band shapes in a direction of the pass. By applying a stator torque current, that is a q-axis current, to a portion of the rotor surface, where magnetic flux is collected, in a direction of rotor rotation pointed by magnetic poles thereof, rotational torque is generated according to Fleming's left-hand rule.

FIG. 19 shows an example of a conventional three-phase six-pole induction motor. A stator 12 is the same as the stator of FIGS. 17 and 18. Rotor slots 18 for arranging a secondary electric conductor are placed in the proximity of the rotor perimeter. Various shapes such as a shape that a side of the rotor surface is open, may be applied to the rotor slots 18.

FIG. 20 shows a permanent magnet synchronous motor comprising teeth of protruding poles and windings. The detail of the motor is described in Japanese Patent Application No. Hei 10-30218. Numeral 22 indicates a stator looped by three-phase alternating-current windings. The U-phase windings MU1 and MU2 are looped through the tooth STU and the tooth STX, while the V-phase windings MV1 and MV2 are looped through the tooth STV, and the tooth STY, respectively. The W-phase windings MW1 and MW2 are looped through respective teeth STW and STZ. The width of each of the teeth is 45° in terms of rotational direction degrees of the rotor and 180° in terms of electrical degrees. A magnetic path bypass BPT for passing magnetic flux from the rotor to a yoke portion of the stator 22 is placed on each space between the teeth. The width of each magnetic path bypass BPT is 15° and 60° in terms of electrical degrees.

The relative phase of each of the of U phase, V phase, and W phase windings is 120°, in terms of relative electrical degrees.

Numeral 21 indicates a rotor the perimeter of which is mounted with permanent magnets 20. Magnetic poles of the permanent magnets 20 are oriented in a direction indicated by N and S of FIG. 20. In the example of the figure, the rotor has eight poles and the width of each of the magnetic poles is 45° and 180° in terms of electrical degrees.

The present invention was created to resolve the common problem of torque ripple.

Common denominators among the stators of conventional motors such as the motors shown in FIGS. 17, 18, 19, and 20 are as follows. Because the windings of the stator are scattered in each of the slots, a distribution of the windings is discrete in the direction of rotor rotation. Current to be applied is generally two-phase or three-phase current, discontinuous, and discrete as shown in the winding diagram of FIG. 2 and the current-phasor diagram of each of the currents of FIG. 3. Although it is basic construction for the motors of this type that the slots are scattered on the circumferences of the stator, the structure is capable of being improved through increasing the number of the slots so as to be more continuous. In addition, there is a method of skewing the stator against the rotor relatively by a 1-slot pitch for reducing the torque ripple caused by discreteness of the slots. However the method has disadvantages that complicated construction for skewing brings about an increase in motor costs and the skewing makes the output torque of the motor decrease. In the particular case of the reluctance motor shown in FIG. 18, problems that magnetic flux within the rotor operated exists in an axial direction and in the direction of rotor rotation by the skewing and components of torque ripple has been experimentally demonstrated, though such torque ripple can not be assumed from the cross-sectional view of the motor of FIG. 18.

For distribution on the circumference of the stator of currents passing through each of the slots when three-phase sinusoidal current is applied to each phase of the motor, it is ideal for the distribution of the currents to have a sinusoidal shape. However, because the same U-phase current is passing through the slot 1 and 2, for example, and a Z-phase current which is negative phase of W-phase is passing through the next slot 3 as shown in the current-phasor diagram of FIG. 3, there is a phase difference of 60° in terms of electrical degrees between slot 2 and slot 3. Generated torque of a motor becomes nonuniform, even though a motor current is activated with the three-phase sinusoidal current because the current of the slots is not distributed in the sinusoidal shape as mentioned above. The result is the generation of torque ripple.

A motor having a construction as indicated by the winding diagram of the short-pitch winding of FIG. 4, wherein the current distribution on the circumference of the stator spreads in the sinusoidal shape, is considered below. It can be seen from the current-phasor diagram of FIG. 5 that an appropriate phase and suitable amplitude RR are applied to the slots 1, 3, 5, 7, 9, and 11 as described before. However, for the current applied to the slots 2, 4, 6, 8, 10, and 12, the phase is suitable but the amplitude is indicated by RS being smaller value of COS30°=0.866 with respect to the amplitude RR. Thus, this motor has a problem that torque ripple is caused by this inhomogeneity.

There are further problems of magnetic vibration and magnetic noise of the motor in addition to the torque ripple when the current distribution on each of the slots is non-uniform. These problems become major factors affecting the use of such a motor in precision machines where concern for vibration and noise is great, and in household electrical appliances used in a living environment.

In the teeth of the protruding poles and windings shown in FIG. 20, winding work of the stator is easier and costs are lower as compared to the permanent magnet synchronous motor of FIG. 17. Moreover, in such a motor it is possible to loop the windings in high density and thereby minimize coil ends. This provides advantages of making the motor smaller in size and lower in cost. However, it is difficult to achieve the distribution of magnetic flux spread in the sinusoidal shape because of the simple shape of the stator. Therefore, the motor has a problem of high torque ripple. As a remedy for decreasing the torque ripple, it may be considered to alter the shape of the motor in order to be controlled by five-phase sinusoidal current. Whatever the case may be, there are disadvantages that the cost of the motor becomes high and the generated torque of motor decreases.

In addition, the high torque ripple causes problems about precision for motor control, vibrations, and noise.

SUMMARY OF THE INVENTION

It is an object of the present invention to reduce torque ripple in a motor. It is a further object of the present invention to concurrently decrease vibration and noise while achieving more accurate control of rotational speed and positions by reducing the torque ripple.

In a common three-phase alternating-current motor or the like wherein a plurality of slots for arranging a winding on the stator are located on the circumference, a winding of each phase is looped through each of the slots as follows. The product of the number of turns in each of the slots on the stator and a live current, in other words a phase and amplitude of a current phasor represented by amperes and the number of turns, is almost equal from a viewpoint with reference to each of the slots when the three-phase sinusoidal alternating current is applied.

The present invention also suggests at construction whereby stator space can be more efficiently used. In that construction, a position in a direction of rotor rotation of each of the teeth of the stator is uniformly located on the inner radius of the stator, and the slots are formed in such a manner as to have an area relationship such that a cross-sectional area of each of the slots is roughly proportional to the amount of windings in each of the slots. As a result, the area relationship within the stator is determined such that the size of each of the slots have the most suitable measurement for the amount of the windings looped through each of the slots.

In a polyphase alternating-current motor wherein a plurality of slots for arranging the winding on the stator are located on the circumference, when a current phasor of the winding arranged in each of the slots is nonuniform, another method for correcting the inhomogeneity is as follows. The motor is constructed such that each spacing between the teeth on the stator is roughly proportional to the magnitude of a current phasor generated by the winding arranged in each of the slots, in other words proportional to the maximum value of currents.

As a method for reducing the torque ripple caused by discrete placement of the slots on the stator, the rotor can be constructed so as to have a plurality of magnetic poles placed such that a position in a direction of rotor rotation of each of the magnetic poles is shifted to the direction of the rotor rotation by NN/NR of a 1-slot pitch against a position located on equivalent spacing. Here, NN is an integer determined by magnetic pole. There are two or more integers in all the magnetic poles of the rotor. And NR, which is a unique integer for the rotor, represents a type of shifting the magnetic poles on the rotor to the direction of rotor rotation and the maximum value thereof is the number of the magnetic poles of the rotor.

A further method for reducing the torque ripple is as follows. When the number of the type of the magnetic poles on the rotor shifted to the direction of rotor rotation, mentioned above, is NR, the rotor and the stator are so constructed as to be relatively skewed to the direction of rotor rotation by an angle smaller than or equal to one half of the slot pitch, or be relatively staggered in the direction of rotor rotation with being divided into two or more sets in a direction of rotor axis in order to attain equivalent effects to the skewing. This allows components of torque ripple, having been not removed by aforementioned shifting of the magnetic poles on the rotor, to be removed by skewing of a slight angle.

Another method for reducing the torque ripple, when both the slots in the stator and the slots or slits on the rotor side are located discretely, is to construct a vernier relationship in which a discrete pitch of being discrete in the internal structure of the rotor is not an integral multiple of a slot pitch of the stator. In addition, this method may be favorably combined with one or more of the constructions for reducing the torque ripple described above to achieve greater effect.

A method for reducing the torque ripple in the permanent magnet synchronous motor, wherein the north poles or the south poles are located successively in a direction of rotor rotation on the perimeter of the rotor, is as follows. The rotor is constructed such that a boundary position between the magnetic north pole and the magnetic south pole is shifted to the direction of rotor rotation by NN/NR of a 1-slot pitch of the stator against a position located on equivalent spacing.

In a polyphase alternating-current motor wherein a plurality of slots for arranging a winding on the stator are located on the circumference, the stator is constructed as follows. The stator is divided into the number NPP1 smaller than or equal to NPP, where NPP is the number of magnetic poles on the stator, in a direction of rotor rotation in terms of functions. A functional block of the divided stator is shifted to the direction of rotor rotation by NPP2/NPP1 of a 1-slot pitch of the stator against the position located on equivalent spacing. Here NPP2 is an integer.

In a NB-phase permanent magnet synchronous motor comprising a stator of a protruding structure wherein a winding of a certain phase is looped through a tooth of the stator, for the sake of reducing the torque ripple, the motor is comprised with teeth of the stator, of which number is greater than or equal to (NB+2), are mounted. And each of the two or more teeth of the stator has a composite winding looped by windings of two or more types of phases.

In the NB-phase permanent magnet synchronous motor, the motor is further constructed as follows in order to reduce torque ripple. A position in a direction of rotor rotation of each of the teeth on the stator is arranged on the circumference of the stator at a position AE in terms of electrical degrees where phases of greater than or equal to (NB+2) types are located. The amplitude of current phasor of each of the teeth is roughly equal when the entire sum of a current phasor of a winding looped through each of the teeth of the stator is represented as a current phasor of each of the teeth, while a direction of the aforementioned current phasor is roughly coincident with a phase in terms of electrical degrees of a position in a direction of rotor rotation where each of the teeth is located.

Additionally, the motor may be constructed as follows in order to further reduce the torque ripple. Taking a position in a direction of rotor rotation of each of the teeth of the stator as AE in terms of electrical degrees, the electrical degree AE or (AE−180) of each of the teeth is located at a position equally divided into the number of an integer NSK between 0° and 180°. The rotor and the stator are relatively skewed by an angle roughly equal to (180°/NSK) or an angle being an integral multiple of the (180°/NSK).

The aforementioned permanent magnet synchronous motor comprising protruding poles is constructed as follows. A magnetic path bypass BPT for passing magnetic flux, which is undesirable and unnecessary for motor operation, through a yoke portion of the stator from the rotor is located between the teeth of the stator. The magnetic path bypass BPT is structurally designed to be separated from the stator for the sake of improving the workability at looping the windings through each of the teeth. Therefore, the bypass of a magnetic path may be installed after looping the windings.

In a common three-phase alternating current motor or the like wherein a plurality of slots for arranging the windings on the stator are located on the circumference, all torque ripple, except the torque ripple caused by discrete placement of the slots on the stator, is theoretically removed when, about a phase and amplitude of current phasor, the phase corresponds to a position of each of the slots and the amplitude of the entire current phasor is equal. Thus, torque ripple is reduced.

The motor described above requires that the number of turns be determined according to individual phase such that a current phasor of each of the slots has an appropriate phase and amplitude. As a result, the number of all turns of windings varies from slot to slot. Therefore, the percentage of effective use of the stator may be increased by forming the slots so as to have the area relationship that a cross-sectional area of each of the slots is roughly proportional to the amount of windings in each of the slots. This allows motor size to be reduced.

When a current phasor of windings placed in each of the slots is nonuniform, an alternating method for the method of changing the number of turns in order to correct the inhomogeneity is to construct the stator such that spacing between the teeth on the stator is roughly proportional to the amplitude of current phasor generated by the windings arranged in each of the slots, in other words proportional to the maximum value of currents. As a result, for example, the spacing between the teeth is decreased when the amplitude of the current phasor is small. This allows the ratio between the amplitude of the current phasor and the spacing of the teeth on the corresponding portion, in other words a current density per unit angle, to be uniform across the entire perimeter of the stator. Consequently, torque ripple is reduced.

As a method for reducing the torque ripple caused by discrete placement of the slots on the stator, the rotor may be constructed in such a manner as to have a plurality of magnetic poles placed such that a position in a direction of rotor rotation of each of the magnetic poles is shifted to the direction of the rotor rotation by NN/NR of a 1-slot pitch against a position located on equivalent spacing.

Although a certain torque including components of torque ripple in a period of a slot pitch harmonic content thereof is generated between the stator and each of the magnetic poles on the rotor, the aforementioned shifting of magnetic poles cancels the components of torque ripple in periods smaller than or equal to the slot pitch. As a result, the torque ripple may be reduced.

A further method for reducing the torque ripple is as follows. The rotor and the stator are constructed such that they area skewed relative to the direction of rotor rotation by an angle smaller than or equal to one half the slot pitch, or staggered relatively to the direction of rotor rotation with being divided into two or more sets in a direction of rotor axis in order to attain equivalent effects to the skewing. This cancels the torque ripple in periods smaller than or equal to one-half of a slot pitch and may reduce the torque ripple.

Another method for reducing the torque ripple, when both the slots in the stator and the slots or slits on the rotor are scattered, is to construct a vernier relationship such that a discrete pitch in the internal structure of the rotor is not an integral multiple of a slot pitch of the stator. The vernier structure reduces the torque ripple, and as an additional plus, combining this method with a plurality of kinds of other constructions for reducing the torque ripple produces more effects. As a result, the torque ripple may be further reduced to near its lowest possible level.

In the permanent magnet synchronous motor, wherein the north poles or the south poles are successively located in a direction of rotor rotation on the perimeter of the rotor, the torque ripple is reduced by a following construction. A boundary position between the magnetic north pole and the magnetic south pole is shifted to the direction of rotor rotation by NN/NR of a 1-slot pitch against a position located on equivalent spacing. This produces an equivalent effect to the sifting of magnetic poles described above and may reduce the torque ripple.

In the polyphase alternating-current motor wherein a plurality of slots for arranging the windings on the stator are located on the circumference, the torque ripple may be reduced by a following method. The stator is divided into the number NPP1 smaller than or equal to NPP, where NPP is the number of magnetic poles of the stator, in a direction of rotor rotation in terms of a function. And the divided functional block of the stator is shifted to a direction of rotor rotation by NPP2/NPP1 of a 1-slot pitch of the stator against the position located on equivalent spacing, where NPP2 is an integer. In this case, the stator side is shifted as opposed to the shifting of magnetic poles stated above. These constructions are relatively equal and produce similar effects. Then, the torque ripple may be reduced.

In a NB-phase permanent magnet synchronous motor comprising a stator of protruding structure wherein a winding of a certain phase is looped through a tooth of the stator, a larger number of polyphase alternating-current motor is substantially materialized by a following method. The motor is comprised with teeth of the stator, of which number is greater than or equal to (NB+2) in order to reduce the torque ripple. And each of the two or more teeth has a composite winding wherein windings of two or more types of phases are looped through. This allows the motor to be driven more smoothly, in other words allows the torque ripple to be smaller.

Add to this, making a more uniform distribution in terms of electrical degrees and a structure being equivalent spacing in terms of phases about the amplitude and phase of the current phasor of each of the teeth on the stator in the NB-phase permanent magnet synchronous motor, the torque ripple may be reduced.

And when the phase of aforementioned equivalent spacing is achieved, skewing by a pitch of the spacing or a pitch of an integral multiple of the space may cancel the torque ripple in periods smaller than the pitch of the equivalent spacing. This result in a decrease of the torque ripple.

In the aforementioned permanent magnet synchronous motor comprising protruding poles, it becomes possible to remove the magnetic path bypass BPT at winding work of the stator by making the magnetic path bypass BPT capable of being separated from the stator. This allows the winding work to be easier and allows a motor cost to be decreased.

DESCRIPTION OF THE PREFERRED EMBODIMENT

Figure 1:
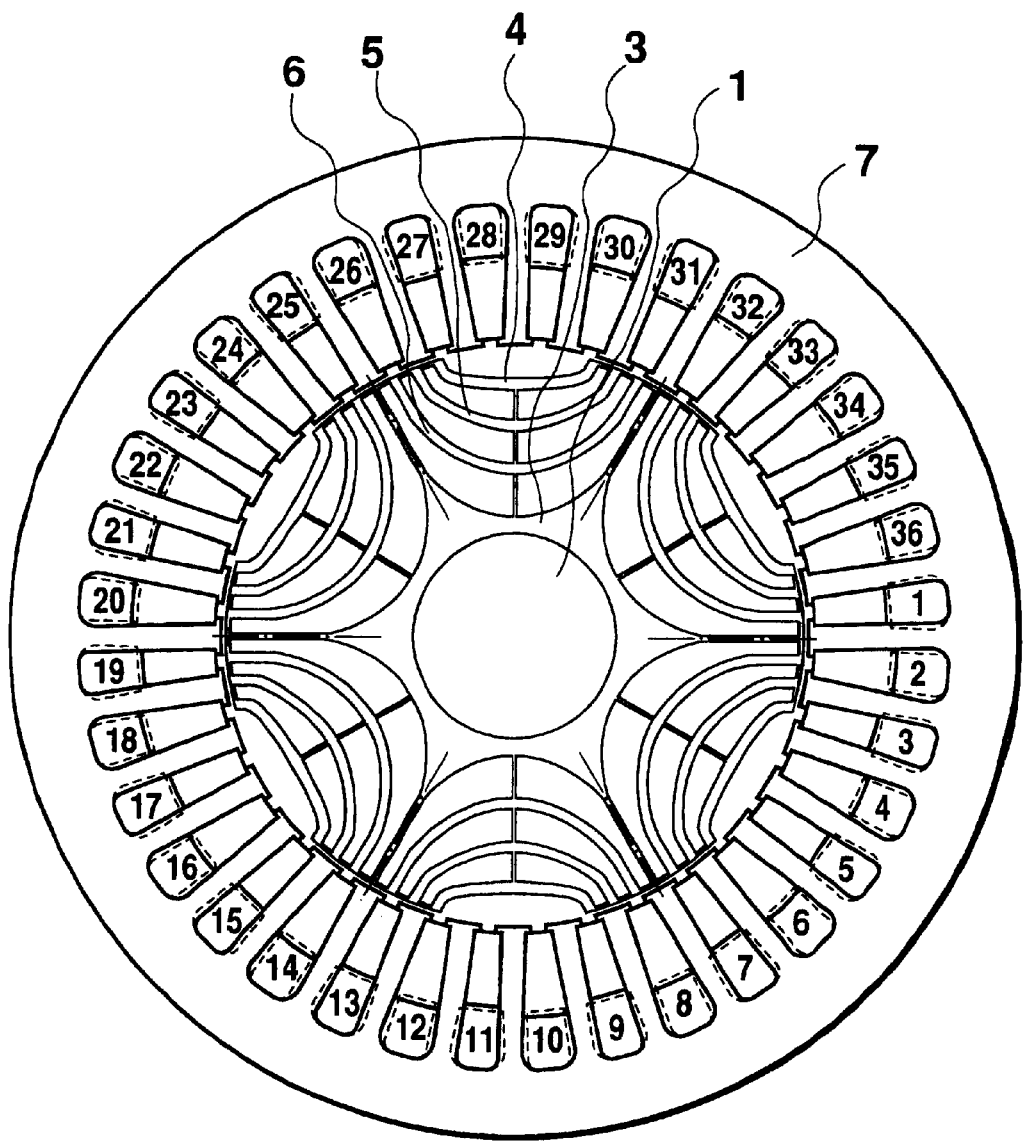
FIG. 1 is a sectional view of a reluctance motor of this invention.

FIG. 1 shows of a three-phase six-pole 36-slot reluctance motor according to a preferred embodiment of the present invention. For a full-pitch winding shown in the winding diagram of FIG. 2 wherein three-phase sinusoidal alternating current is applied to each winding, each current phasor of currents passing through each slot can be represented as shown in FIG. 3. It is understandable from the figure that discontinuity of current phasor between adjacent slots is high.

Figure 3:
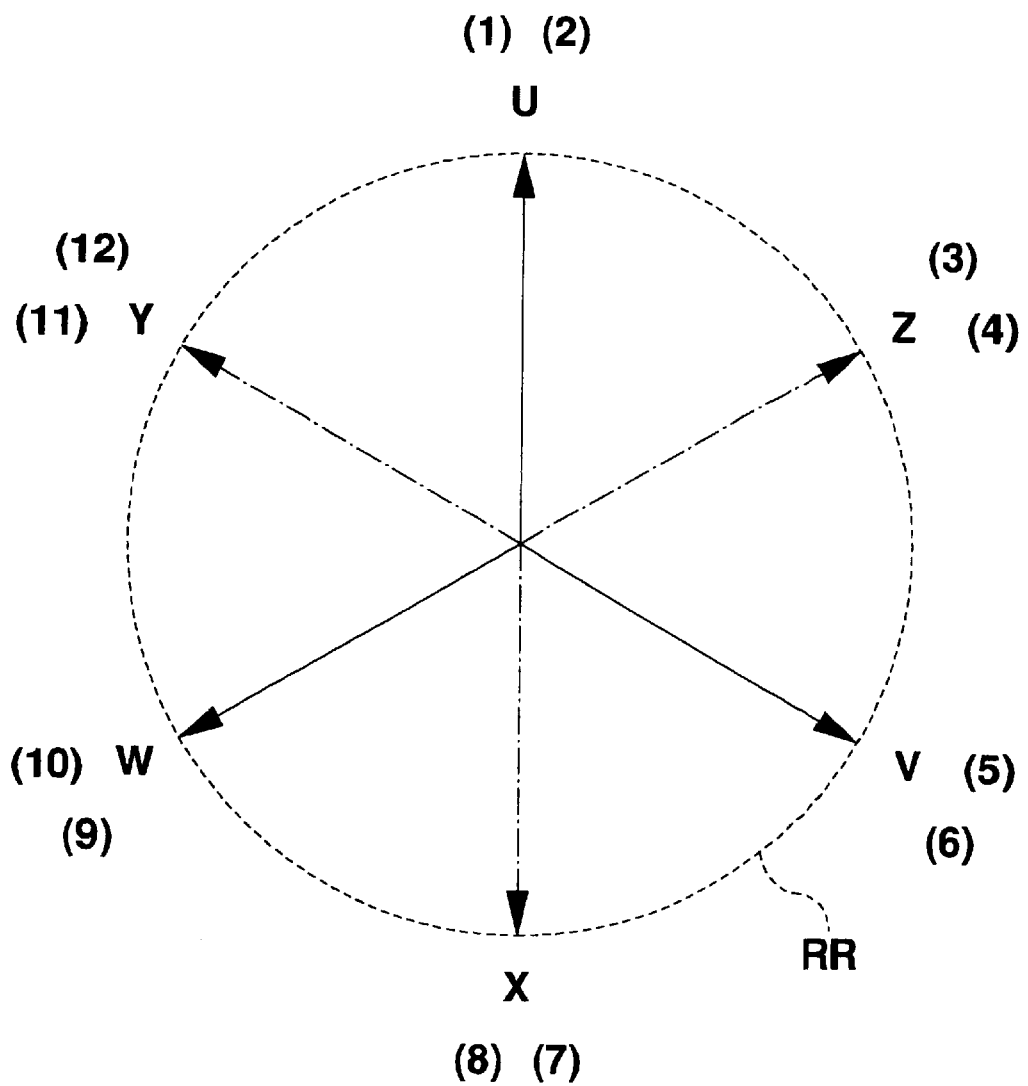
FIG. 3 is a current-phasor diagram at applying the winding of FIG. 2.
Figure 4:
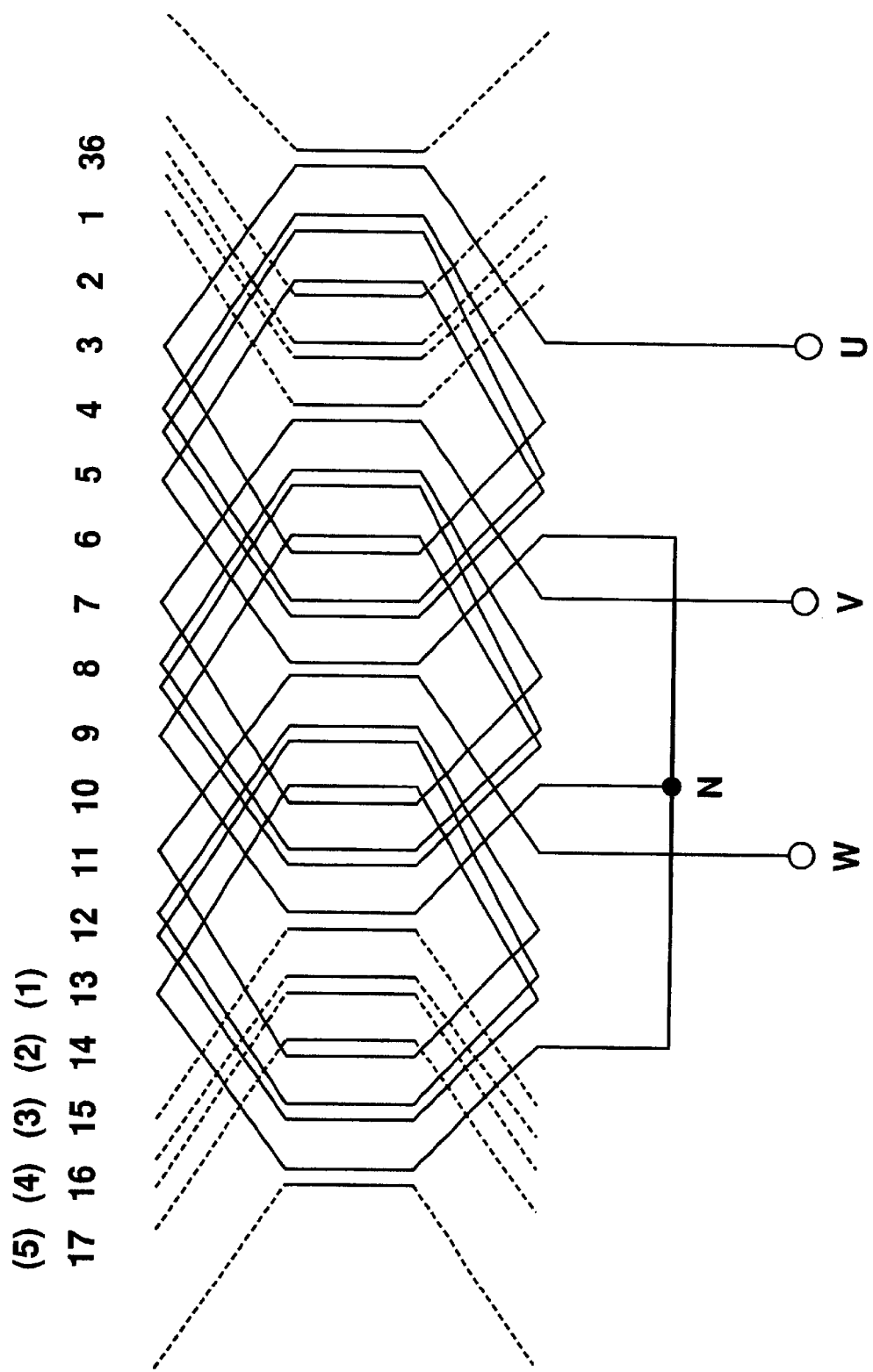
FIG. 4 is a winding diagram of a short-pitch winding of the FIG. 1 motor.
Figure 5:
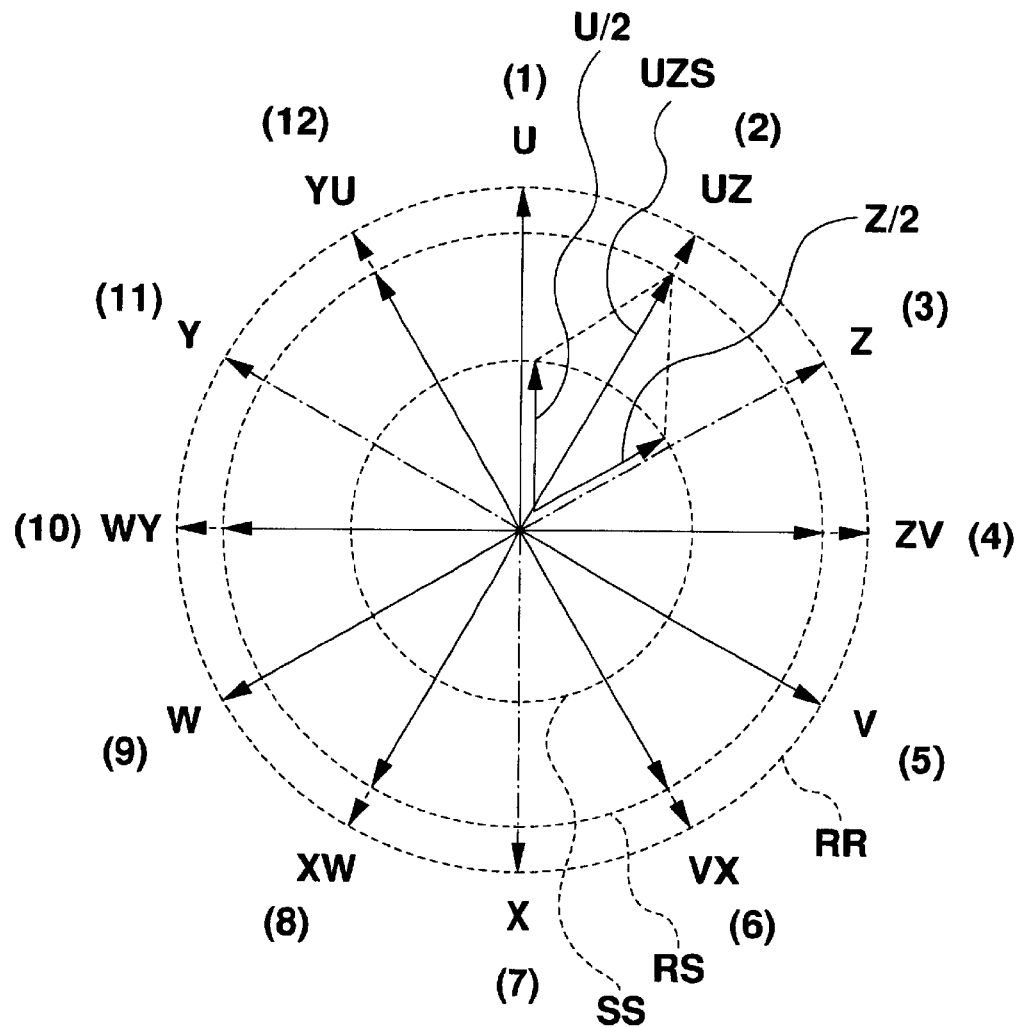
FIG. 5 is a current-phasor diagram at applying the winding of FIG. 4.

For a short-pitch winding as shown in the winding diagram of FIG. 4, each current phasor can be represented as shown in FIG. 5. The discontinuity of current phasor between adjacent slots is highly improved compared to the case illustrated in FIG. 3. As has been discussed, one-half the number of turns of a U-phase winding in the slot 1 and one-half the number of turns of a Z-phase winding in the slot 3 are looped through the winding of the slot 2. The total amplitude RS of current phasor of the windings is the phasor sum UZS of U/2 and Z/2 and is COS30°=0.866 with respect to the amplitude RR. The phase of the current phasor UZS is appropriate and has a phase difference of 30° in terms of electrical degrees with respect to the U-phase.

This invention makes a modification to the current phasor of the slot 2 from the UZS of which amplitude is RS to the UZ of which amplitude is RR. To be more specific, the numbers of turns of both U-phase and V-phase windings looped through the slot 2 are increased to a multiple of (0.5/COS30°)=0.57735 of the number of turns of the slot 1. Consequently, the amplitude of current phasor of the slot 2 becomes RR. Applying the same operation to the slots 4, 6, 8, 10, and 12 produces the result that the motor is driven through the current phasor of 12 phases which distribute uniformly in terms of phases and have equal amplitude. It can be said that the state is an ideal driving condition for a motor with the exception of that the slots are scattered on the circumference of the stator. Therefore, the torque ripple has no periodic components greater than the slot pitch.

The present invention allows the use of any of a vast number of combination methods available for producing the current phasor UZ of which amplitude is RR through selecting and combining the numbers of turns of the U-phase, V-phase, and W-phase windings. A simple method is to produce the winding in the slot 2 using two phases of U phase and V phase. Generally, the simplest combining methods are advantageous in terms of reducing material and assembly costs. For a three-phase six-pole 36 slot configuration as described in FIG. 12 and FIG. 13, a value of the number of turns of each winding varies. However, the concept of making a phase and amplitude of current phasor in each of the slots appropriate remains applicable. The current phasor of which amplitude is equal and phase distributes uniformly may similarly be easily produced using any number of phases, poles, and slots.

Figure 2:
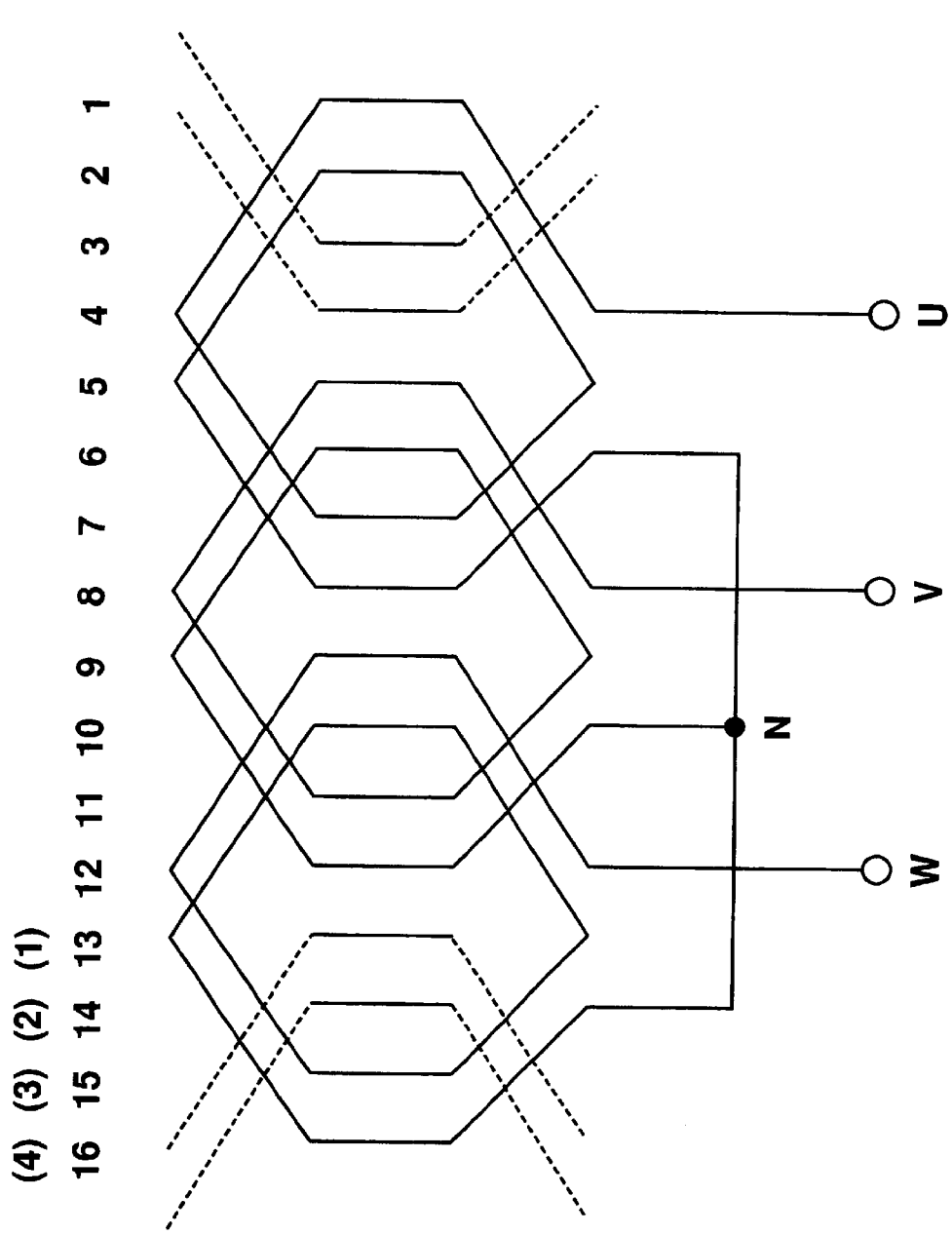
FIG. 2 is a winding diagram of a full-pitch winding of the motor shown in FIG. 1.

A connecting method for connecting windings to each of the slot, known as the sequence of winding operation, is illustrated in FIG. 2 and FIG. 4 using a simplified method to more clearly illustrate the underlying concept. It is possible to change the sequence of winding operation because the change of the sequence does not affect operations as a motor. A method wherein so-called coil ends are capable of being short, the amount of copper used for a portion of the coil ends is few, or winding operation is simplified, is often adopted under normal circumstances.

The technology of this technique is commonly applicable to permanent magnet synchronous motors, reluctance motors, and induction motors, or any similar motor or device comprising a similar stator.

Where the number of all turns of each of the slot on the stator varies, more efficient cross-sectional are of the slot is described below. As described in the current-phasor diagram of FIG. 5, the number of turns of the slot 1, for example, differs from the number of turns of the slot 2. For the slot 2, an extra space for insulating material to apply interphase insulation is also required because windings of two phases are looped. To remedy this situation, it is sufficient to change the cross-sectional area on a slot-by-slot basis according to a required area as shown in cross-sectional shapes of slots of the reluctance motor of FIG. 1. The figure shows that the cross-sectional shapes of the slots indicated by solid lines differ from the cross-sectional shapes of the slots indicated by broken lines.

Another practical method for reducing the amount of a heating value of the stator is making the cross-sectional area of the slots uniform and increasing a winding diameter where the number of turns is low.

Figure 6:
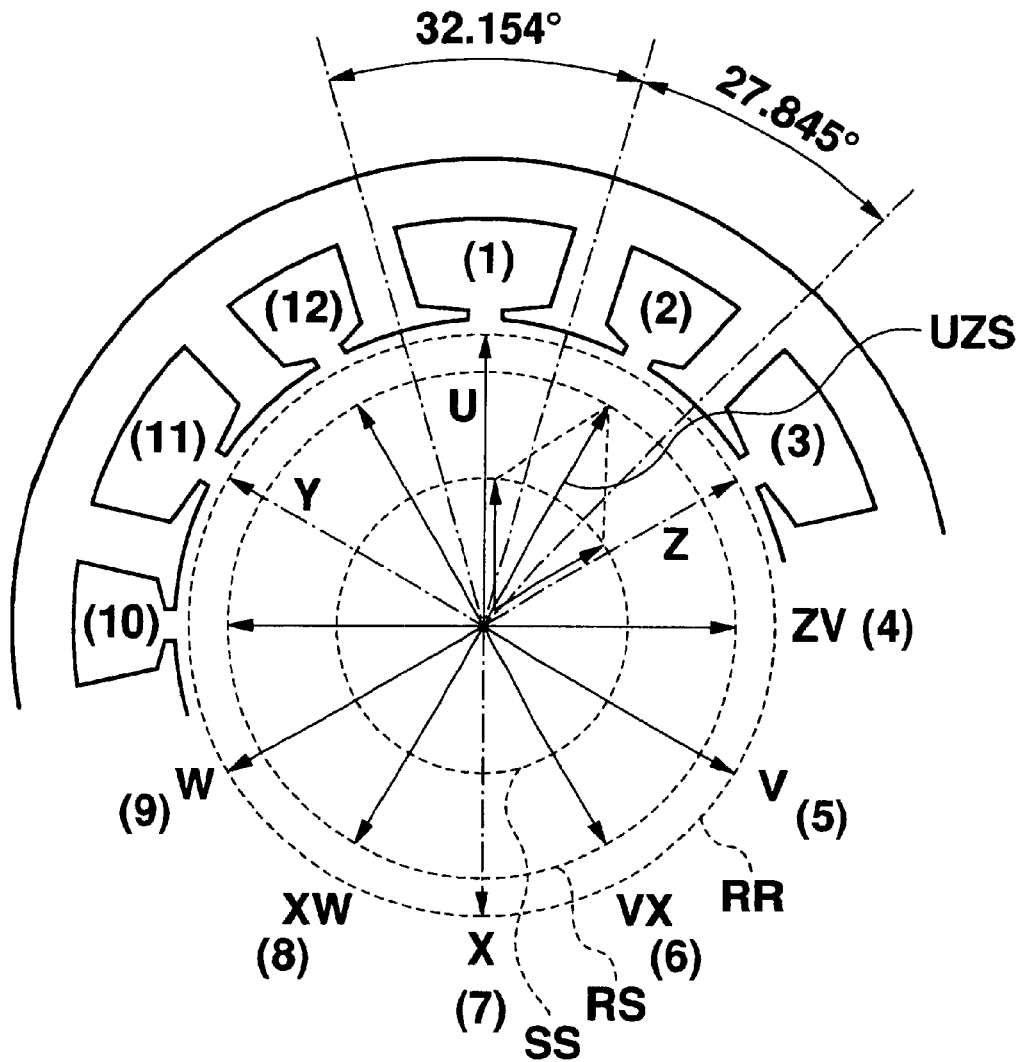
FIG. 6 is a drawing showing a relationship between current phasor and slot width.

FIG. 6 shows another method for reducing the torque ripple in the short-pitch windings shown in the winding diagram of FIG. 4 when the amplitude of the current phasor of each of the slots varies. The amplitude RS of the current phasor UZS is COS30°=0.866 the amplitude RR of the current phasor U as shown in the current-phasor diagram. When the spacing between the teeth of each of the slots is taken as 1: 0.866=32.854°:27.845° as illustrated in FIG. 6, the current densities in the spacing become uniform as they have an equivalent value. Changing the spacing between the teeth of each of the slots through such method results in improving a problem of the torque ripple caused by non-uniform amplitude of the current phasor. Since FIG. 6 is illustrated for the sake of understanding a position of a centerline of each of the teeth, the cross-sectional area of the slot 1 is shown as being different from the cross-sectional area of the slot 2. It is, however, easily achieved to make the cross-sectional areas of each of the slots uniform through changing positions of the midsection of the teeth with remaining the positions of teeth corresponding to the inner radius of the stator unchanged.

Figure 7:
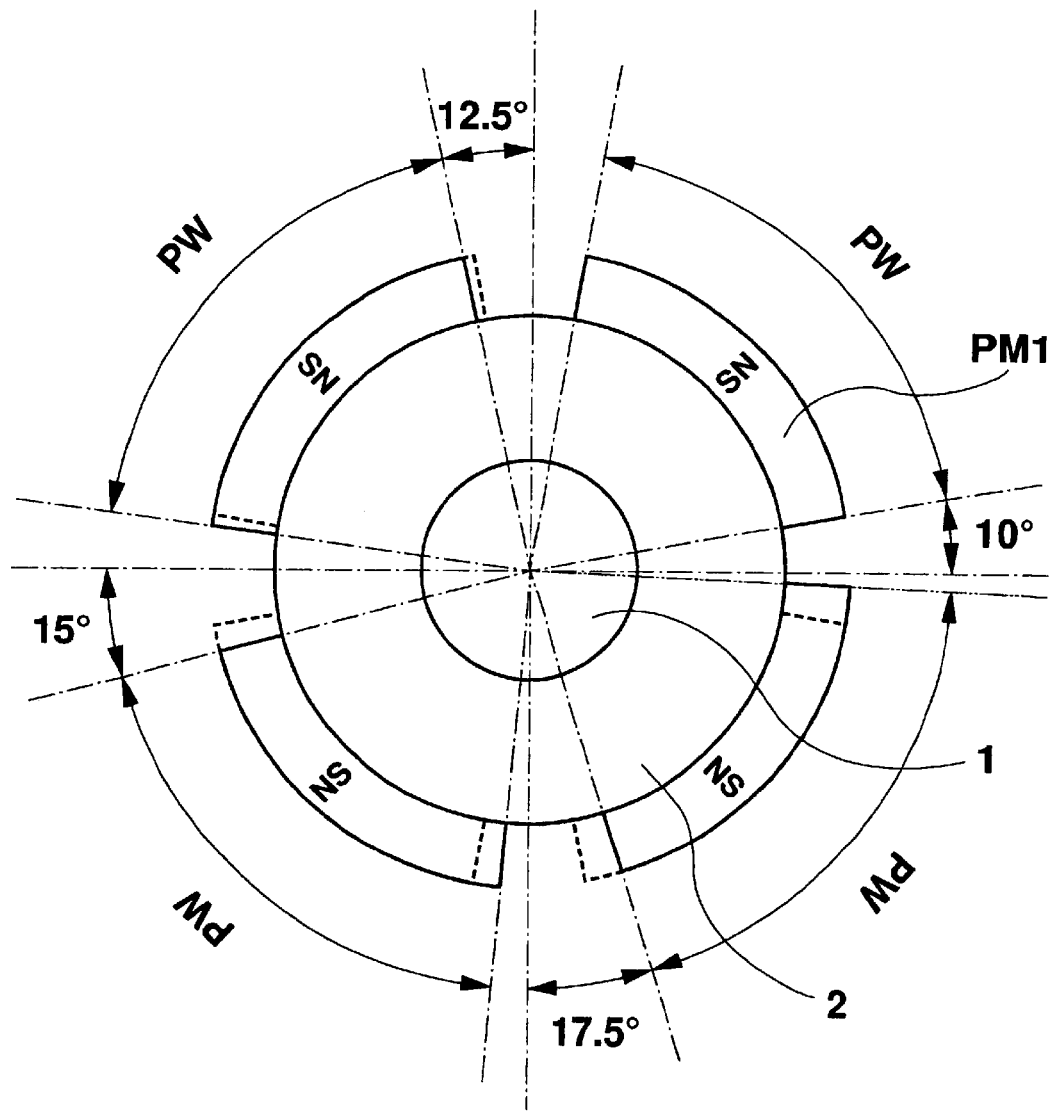
FIG. 7 is a rotor of a motor of permanent magnet type of this invention.

Referring now to a technology for reducing torque ripple in periods smaller than or equal to a slot pitch of the stator, FIG. 7 shows an example of a rotor of a permanent magnet synchronous motor. In FIG. 7 the rotor has 4 poles, numeral 1 is a rotor axis, numeral 2 is an iron core of the rotor, and PM1 is a permanent magnet of which width is an angle PW. Since a stator is not illustrated, four-pole 36-slot stator is assumed in the figure. The positions in a direction of rotor rotation at the ends in a clockwise direction of the permanent magnets are fixed at 10°, 12.50°, 15°, 17.5° angles with respect to centerlines at every 90° angle. Broken lines indicated in the proximity of each of the permanent magnets represent positions of the permanent magnet PM1 of the first quadrant in cases where it is moved to the second, third, forth quadrants. The position of the permanent magnet at each of the quadrants is shifted to a direction of rotor rotation by 2.5°. The value of 2.5° is determined by (slot pitch)/(the number of magnetic poles 4)=2.5° assuming 36 slots. Since each of components of motor torque generated in association with each of the permanent magnets is shifted by a ¼-slot pitch, components of torque ripple in periods of a slot pitch and a ½-slot pitch has been canceled and removed. In addition, it has been already described that the components of torque ripple in periods greater than a slot pitch may be removed through the aforementioned technology of improving the winding method of the stator. And it will be described later that the components of torque ripple in periods smaller than or equal to a ½-slot pitch may be removed by skewing the rotor and the stator by an angle smaller than or equal to a ½-slot pitch.

Figure 8:
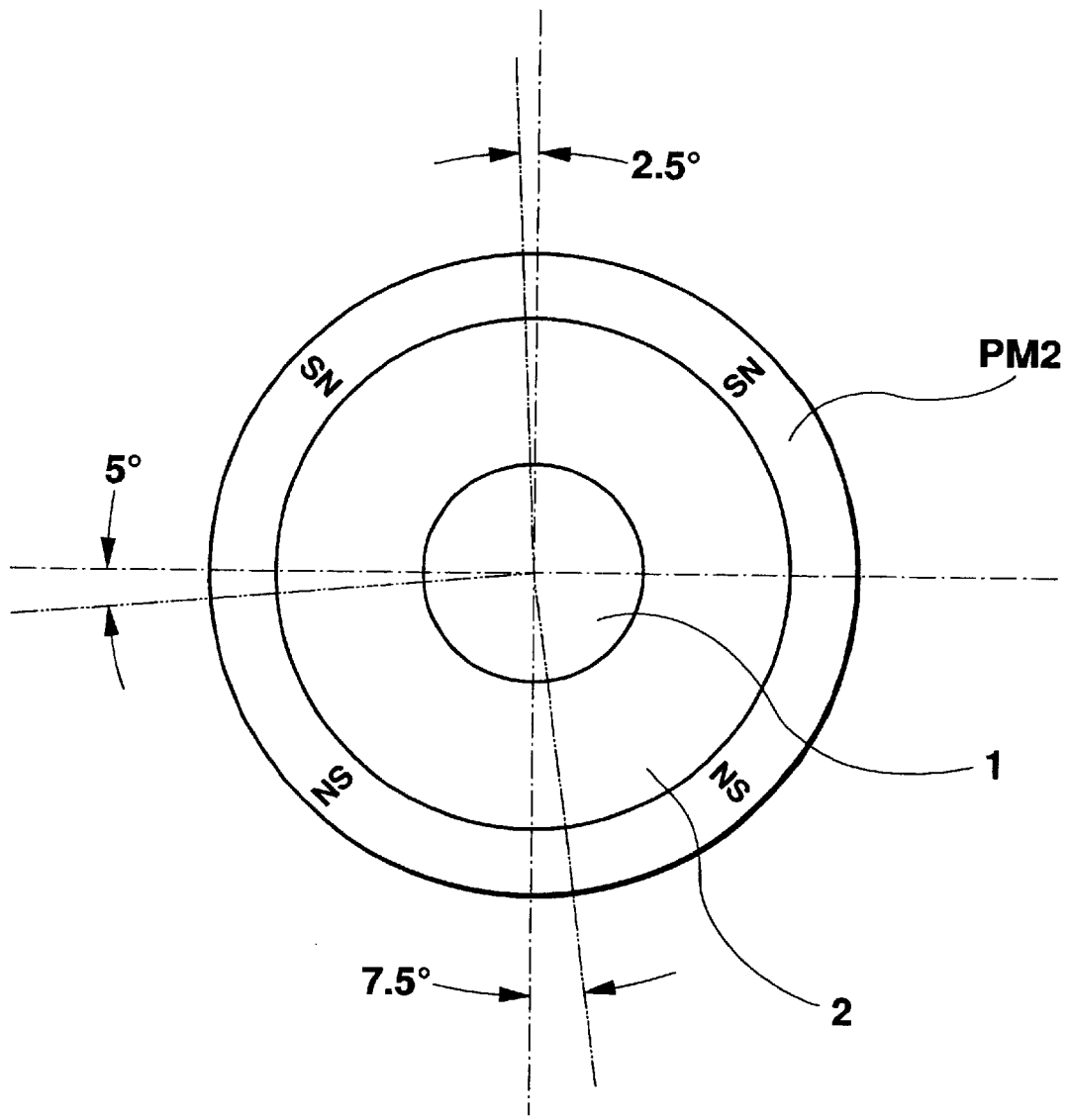
FIG. 8 is a rotor of a motor of permanent magnet type of this invention.

In the following, a method for achieving the effect as in the motor of FIG. 6 using a permanent magnet synchronous motor using cylindrical-shaped permanent magnets PM2 shown in FIG. 8 will be described. In this method, a magnetizing boundary of each of the permanent magnets PM2 is shifted by 2.5°, 5°, and 7.5° respectively. Alternatively, it is possible to produce a portion not magnetized on the magnetizing boundaries of the magnetic poles by employing cylindrical-shaped permanent magnets in order to construct a rotor substantially equivalent to the rotor shown in FIG. 7.

Figure 9:
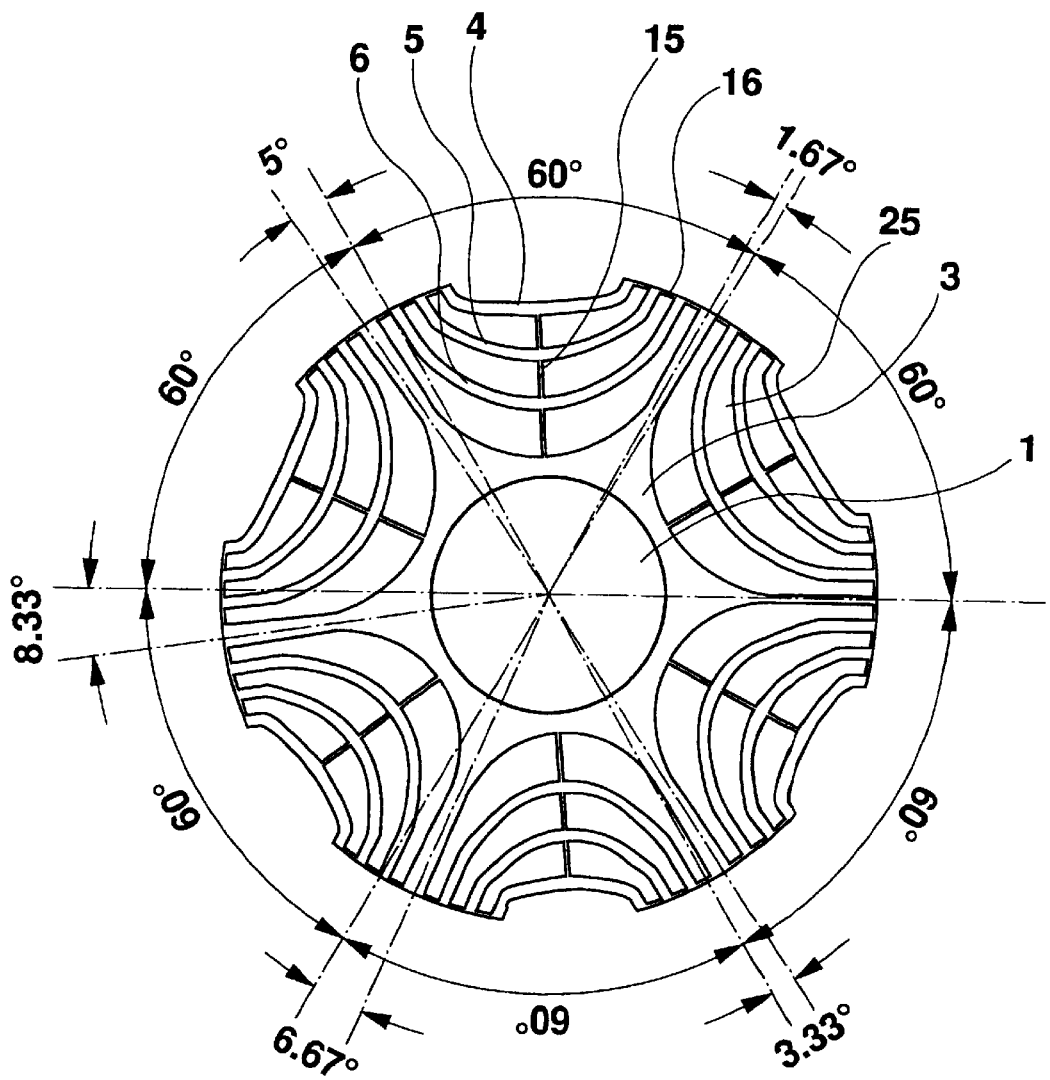
FIG. 9 is an enlarged detail of the rotor of the FIG. 1 motor.

FIG. 9 shows an enlarged view of the rotor of the reluctance motor shown in FIG. 1. In FIG. 9, numeral 1 denotes a rotor axis, and numeral 3 a rotor steel plate in the proximity of the rotor axis. Numerals 4, 5, and 6 are magnetic paths passing through magnetic flux and numeral 25 is a void or a non-magnetic substance. Numerals 15 and 16 are used to label jointing parts which fix the magnetic paths 4, 5, and 6 to each other and to the rotor steel plate.

Centerlines of the rotor are shown by dotted-broken lines at 60° intervals. The magnetic-pole centers of the rotor are located at 1.67°, 3.33°, 5°, 6.67°, and 8.33° against the centerline as mentioned above and shifted by (1-stator-slot pitch/6 poles)=1.67° each to a direction of rotor rotation. Various kinds of combinations for placing shifting angles are available. Operation in terms of electromagnetism between each of the magnetic poles of the rotor and the stator is shifted by the shifting angle mentioned above to a direction of rotor rotation through the above mentioned construction. As a result, the torque ripple in periods under of equal to a 1-stator-slot pitch may be canceled and torque ripple may be reduced. To be more specific, it is easily understandable from a geometric aspect that the torque ripple in 1-slot period and ⅓-slot period is canceled. In addition, it has already been described that the components of torque ripple in periods greater than the slot pitch may be removed through the aforementioned technology of improving the winding method of the stator. It will be described later that remaining components of harmonic torque ripple in periods smaller than or equal to a ⅓-slot pitch may be removed through skewing the rotor and the stator relatively by an angle of a period of the lowest-order harmonic content.

Shifting the positions of the rotor's magnetic poles effectively diminishes skewing problems because skewing angles can be decreased to angles smaller than or equal to (stator slot pitch/2) at removing the harmonic torque ripple further, in addition to an effect of reducing the torque ripple by itself. In the particular reluctance motor shown in FIG. 1 and FIG. 18, it has been verified by experiment that components of torque ripple in periods smaller than or equal to the skewing angle might be reduced yet not removed adequately because magnetic flux within the rotor becomes existing also in a direction of the rotor axis after skewing. In this sense, it is useful to remove the components of torque ripple in periods close to a slot pitch through the aforementioned technique of shifting magnetic poles and remove only the extremely high harmonic components of torque ripple through skewing. Since electromagnetic steel for motor has essentially the 0.5 mm width and is provided with an insulating film against electricity on the surface, it is resistant to generating a eddy-current loss against variations in magnetic flux in the radial direction and in the direction of rotor rotation. This causes a problem that the eddy-current loss increases in the rotor and the stator when magnetic flux changes in the direction of rotor rotation. By this reason, it is preferable that skewing be performed by as small an angle as possible.

Figure 18:
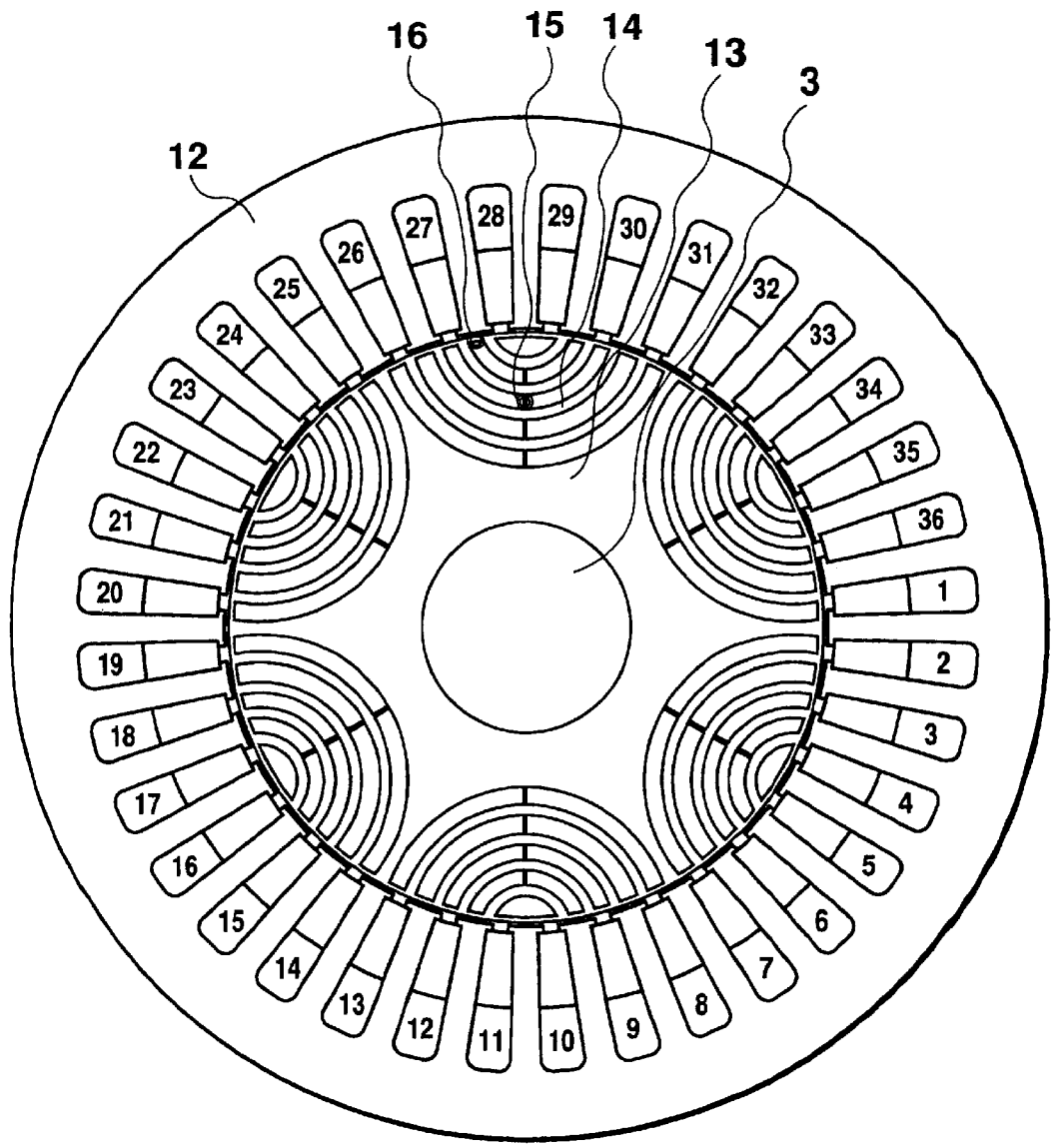
FIG. 18 is a sectional view of a reluctance motor of prior art.
Figure 19:
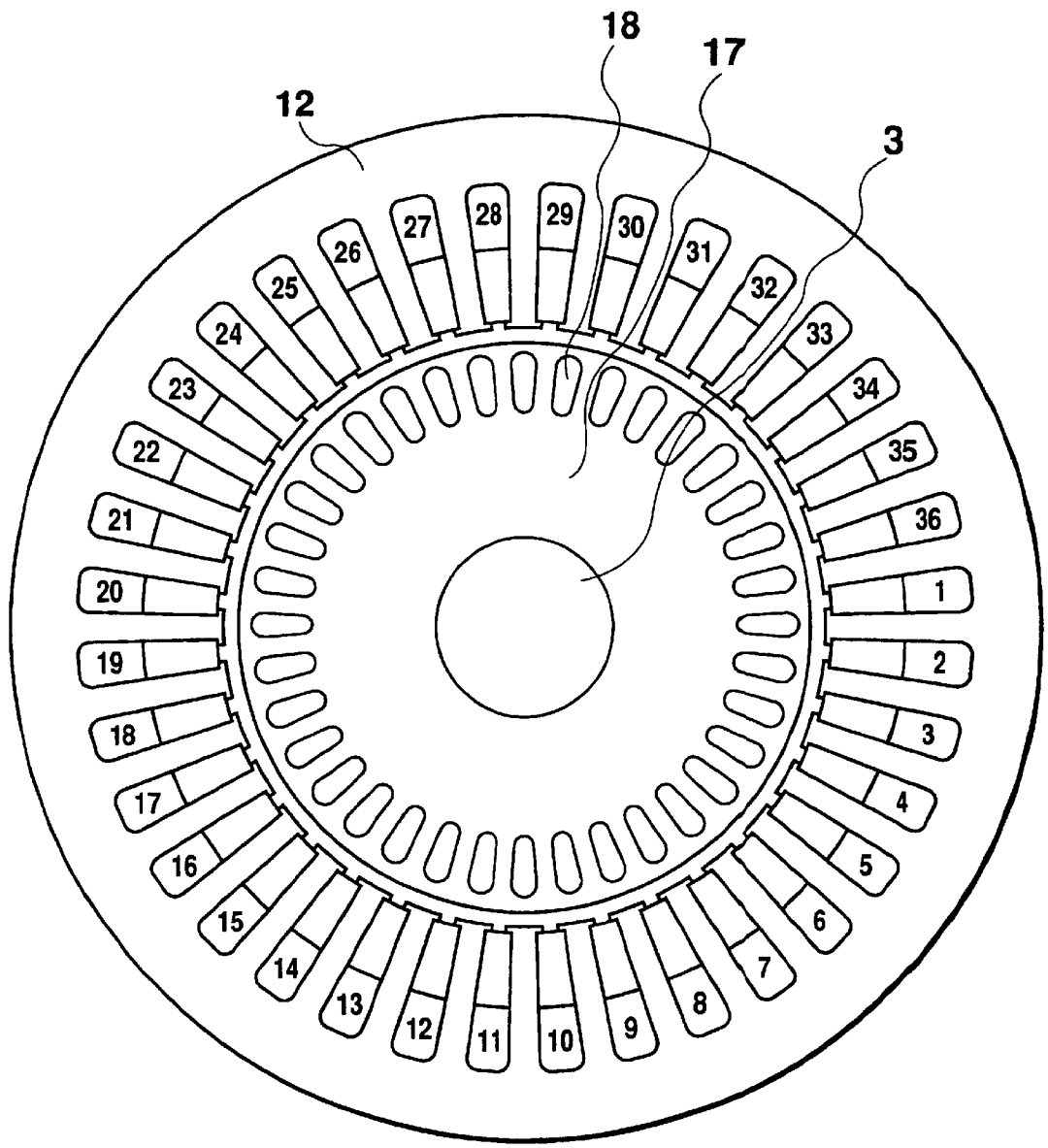
FIG. 19 is a sectional view of an induction motor of prior art.
Figure 20:
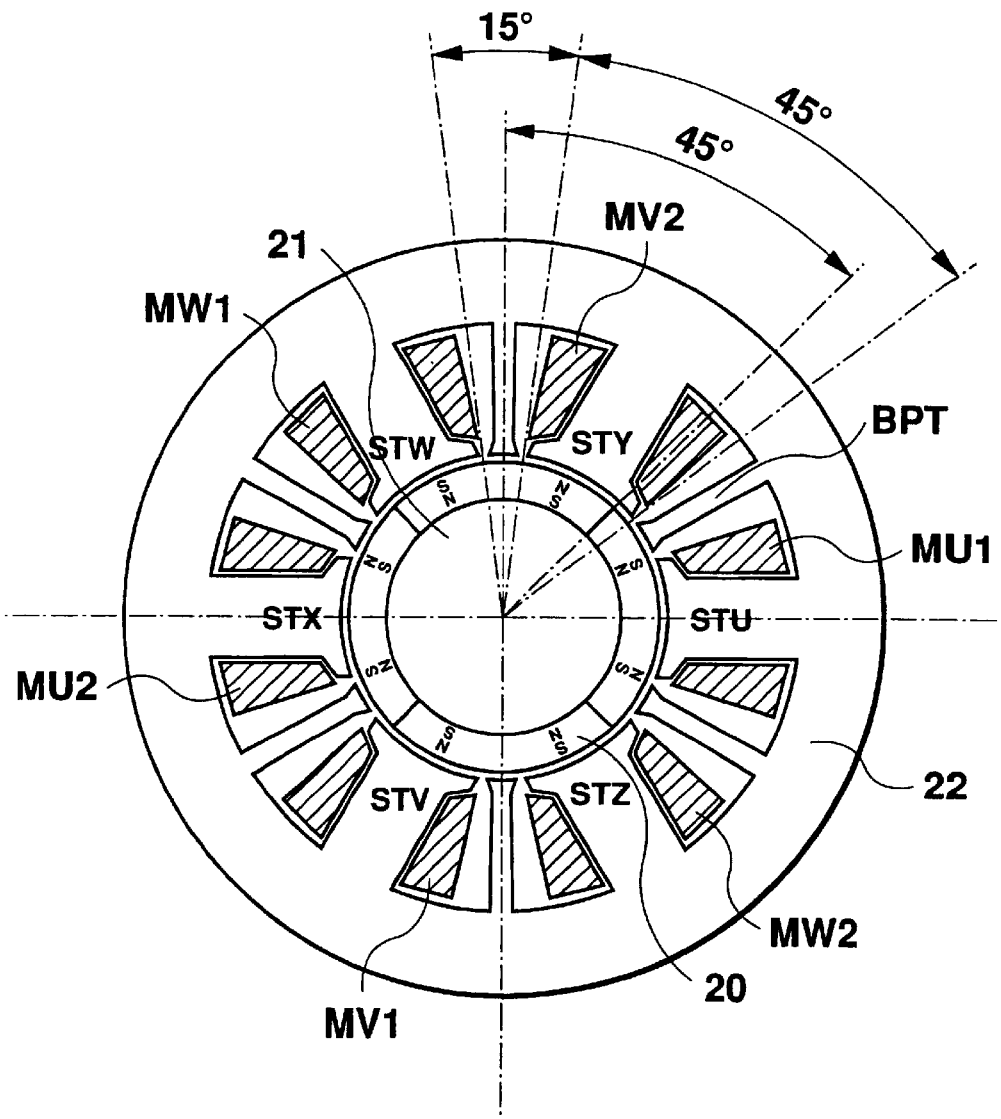
FIG. 20 is a sectional view of a permanent magnet synchronous motor comprising protruding poles of prior art.

In particular to the reluctance motor, sufficient design theory has yet to be established because of the complex relationship between the shape and characteristics of the rotor. It is then important to establish a technique of reducing the torque ripple regardless of the outside and internal shape of the rotor. For example, the rotor of the reluctance motor shown in FIG. 18 is constructed in such a manner that an outside shape of the rotor is nearly a circle and a pattern of an internal shape of the rotor is formed so as to achieve a smooth variation of a distribution of magnetic flux of the magnetic pole on the rotor in a direction of rotor rotation and achieve a sinusoidal distribution. As a result, a motor of which torque ripple is comparatively small is substantiated. It has also been verified by experiment that the torque ripple was reduced when the pattern in the interior of the rotor, in other words a gap between the narrow magnetic paths 14 was formed in finer pattern.

Problems remain with the reluctance motor of FIG. 18. When the internal pattern of a rotor is finely designed, the rotor must be manufactured using etching technology or a wire electric discharge machine or the like. However, mass-production at low cost requires that assembly be possible through a simpler method such as presswork using a stamping die, while a resulting rough internal pattern of the order shown in FIG. 18 does not sufficiently reduce torque ripple. The unintended existence of magnetic flux from the proximity of a boundary portion of the magnetic poles to the stator side caused by a magnetic substance existing in the proximity of boundary portions of the magnetic poles of the rotor leads to additional problems such as that the output torque of the motor, the power factor, and the efficiency, and characteristics of constant-power control by field weaken control at the range of high-speed rotation, are decreased. There has until now been a tradeoff among the various problems mentioned above and the torque ripple, that is, changing the shape of the rotor to resolve the problems causes an increase of the torque ripple.

In the reluctance motor of FIG. 1 and FIG. 9 adopting the technique of reducing torque ripple of this invention, the outside shape of the rotor is not circular. The rotor is formed in a shape having concave parts for resisting the existence of magnetic flux in the boundary portions of magnetic poles of the rotor in order to resist the existence of magnetic flux from the rotor center to the stator. In the internal shape of the rotor, the width of the voids 25 between the magnetic paths 4, 5, and 6 is formed as wide as possible to minimize the components of magnetic flux in a direction perpendicular to the magnetic paths 4, 5, and 6. Moreover, the internal shape of the rotor is adequately rough for manufacturing a stamping die for the sake of performing mass-production through a press using the stamping die at low cost.

Forming such shape of the rotor generated large torque ripple in previous art. However, it has been verified through computer simulated evaluation using a finite element method that the model of FIG. 1 adopting the technology of this invention could reduce torque ripple to on the order of ½ to ¹⁄₂₀ of other motors. It has also been verified that the torque ripple generated by the model could be smaller than or equal to ⅓ of the torque ripple generated by the conventional reluctance motor as shown in FIG. 18.

Figure 10:
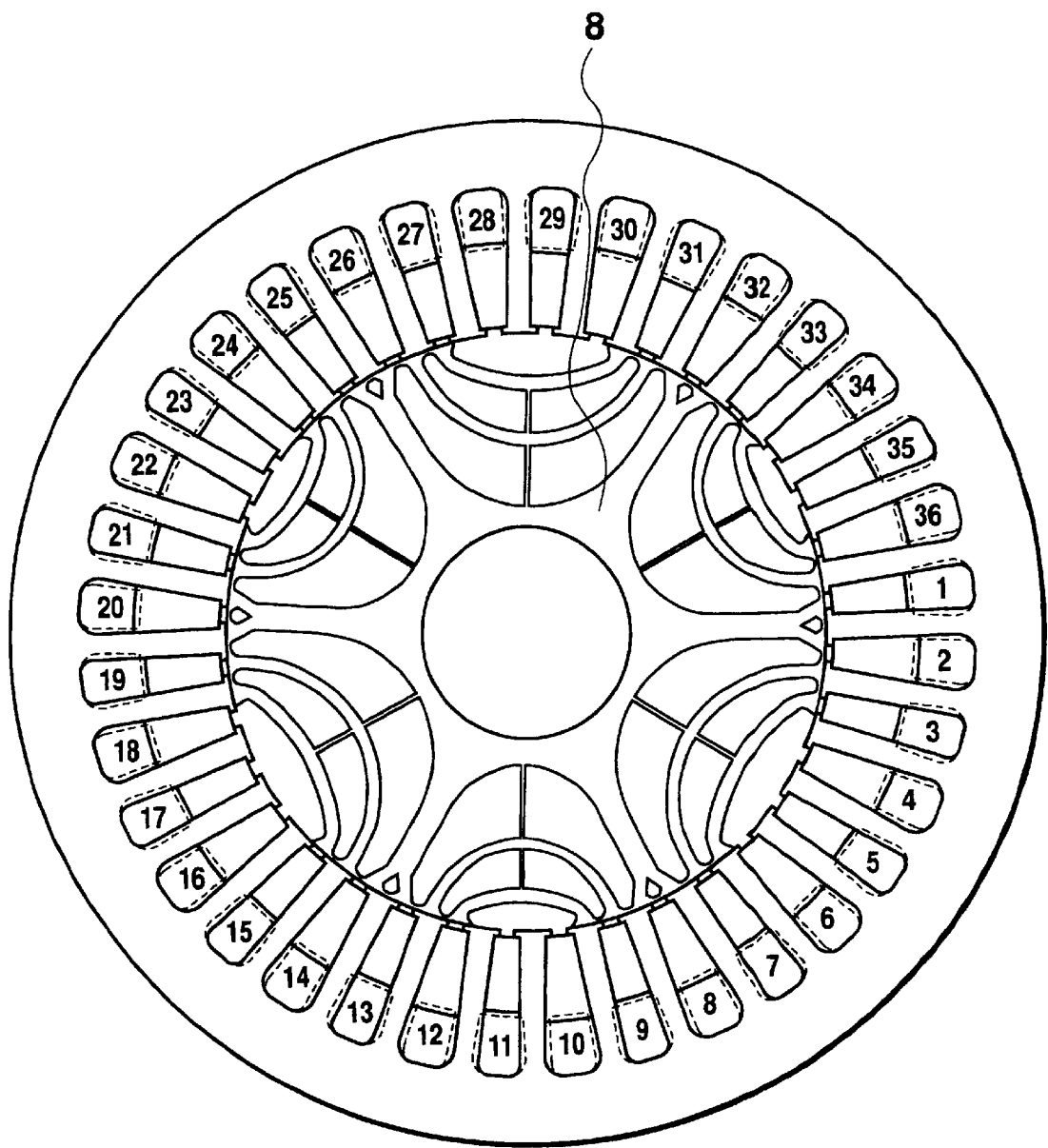
FIG. 10 is a sectional view of a reluctance motor of this invention.

In addition, it has been verified that the torque ripple could be suppressed to an extremely small value of the order of a calculation error of computer simulation, even when the rotor shape of FIG. 9 was altered to the shape of the rotor 8 shown in FIG. 10. In the reluctance motor of FIG. 10, the voids are formed wider as compared with FIG. 9 and motor characteristics other than torque ripple are improved.

According to the technology of this invention, most rotor shapes are considered to be capable of reducing the torque ripple to a value close to zero. This allows motor design to be more flexible in response to intended use.

Figure 11:
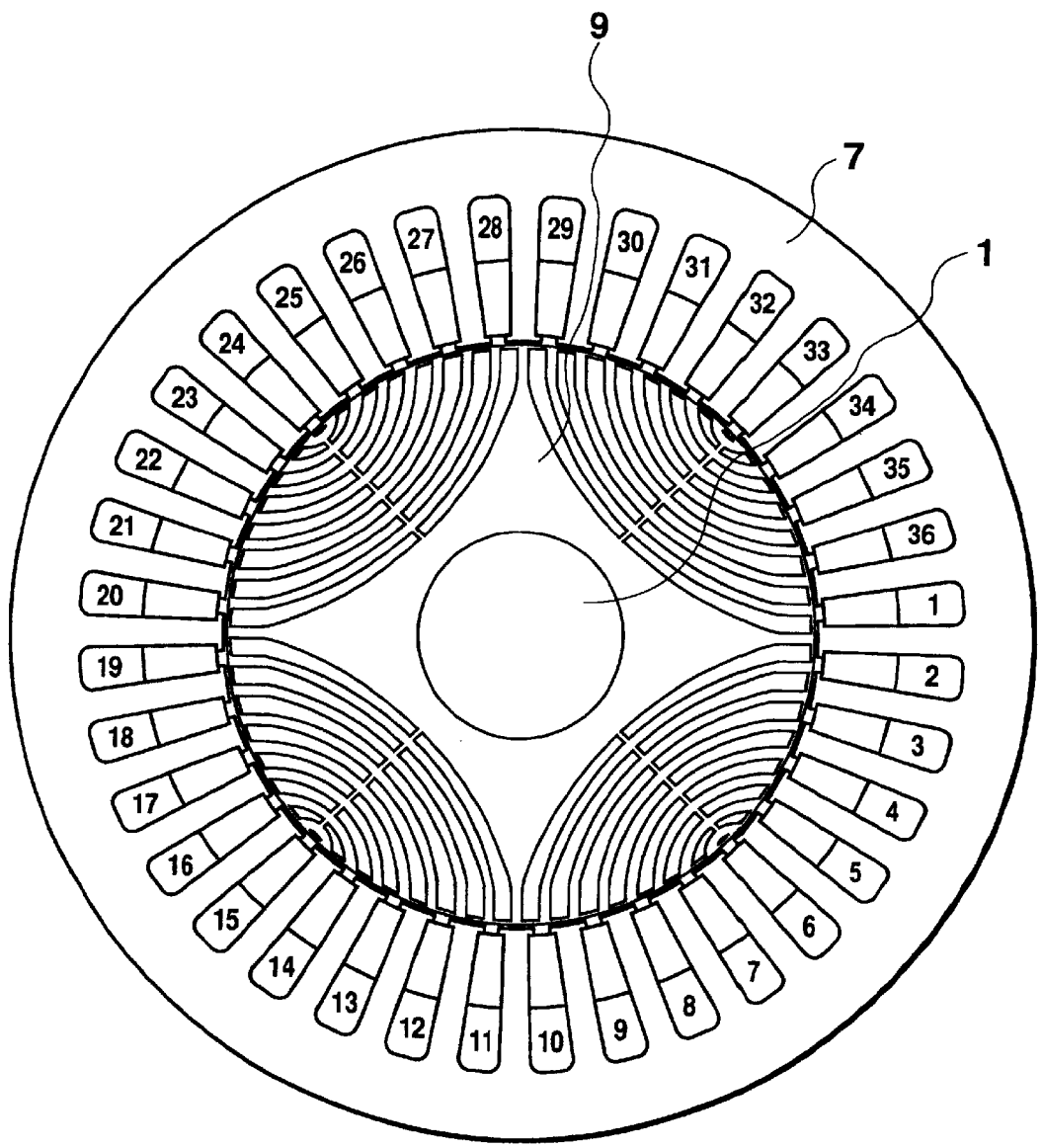
FIG. 11 is a sectional view of the reluctance motor.
Figure 12:
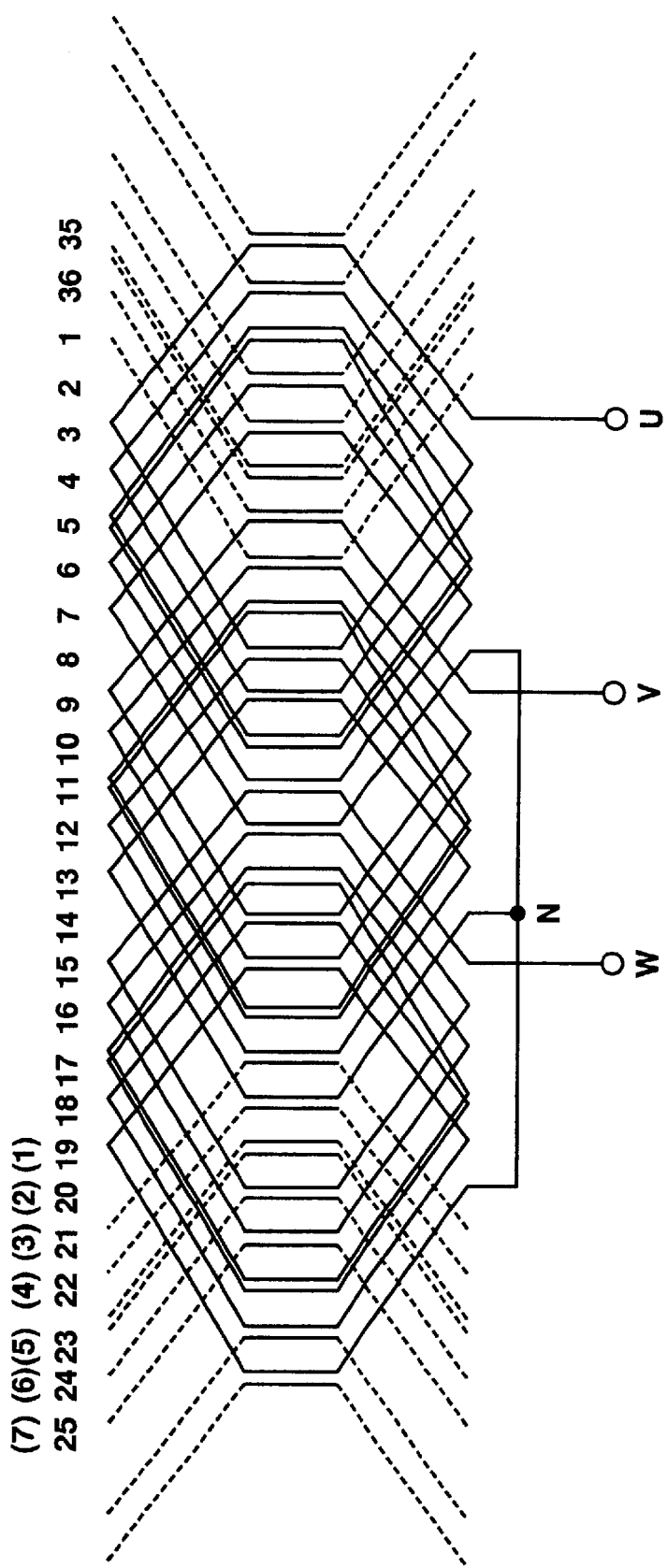
FIG. 12 is a winding diagram of the motor of FIG. 11.

Referring now to an example case of three-phase four-pole 36 slots, FIG. 11 is a sectional view of a three-phase four-pole 36-slot reluctance motor and numeral 9 is a rotor thereof FIG. 12 is a winding diagram of the motor and solid lines indicate windings of 18 slots within the 36 slots. The windings indicated by broken lines are some of remaining windings of 18 slots. A star connection is applied with taking a neutral point as N, looping the U-phase, V-phase, and W-phase windings of 36-portion in series, and connecting the ends X, Y, and Z of each of the windings. However, the ends of 18-slot portion are indicated in FIG. 12 with taking the neutral point as N. This invention may be applied to a delta connection, parallel winding, or the like.

Figure 13:
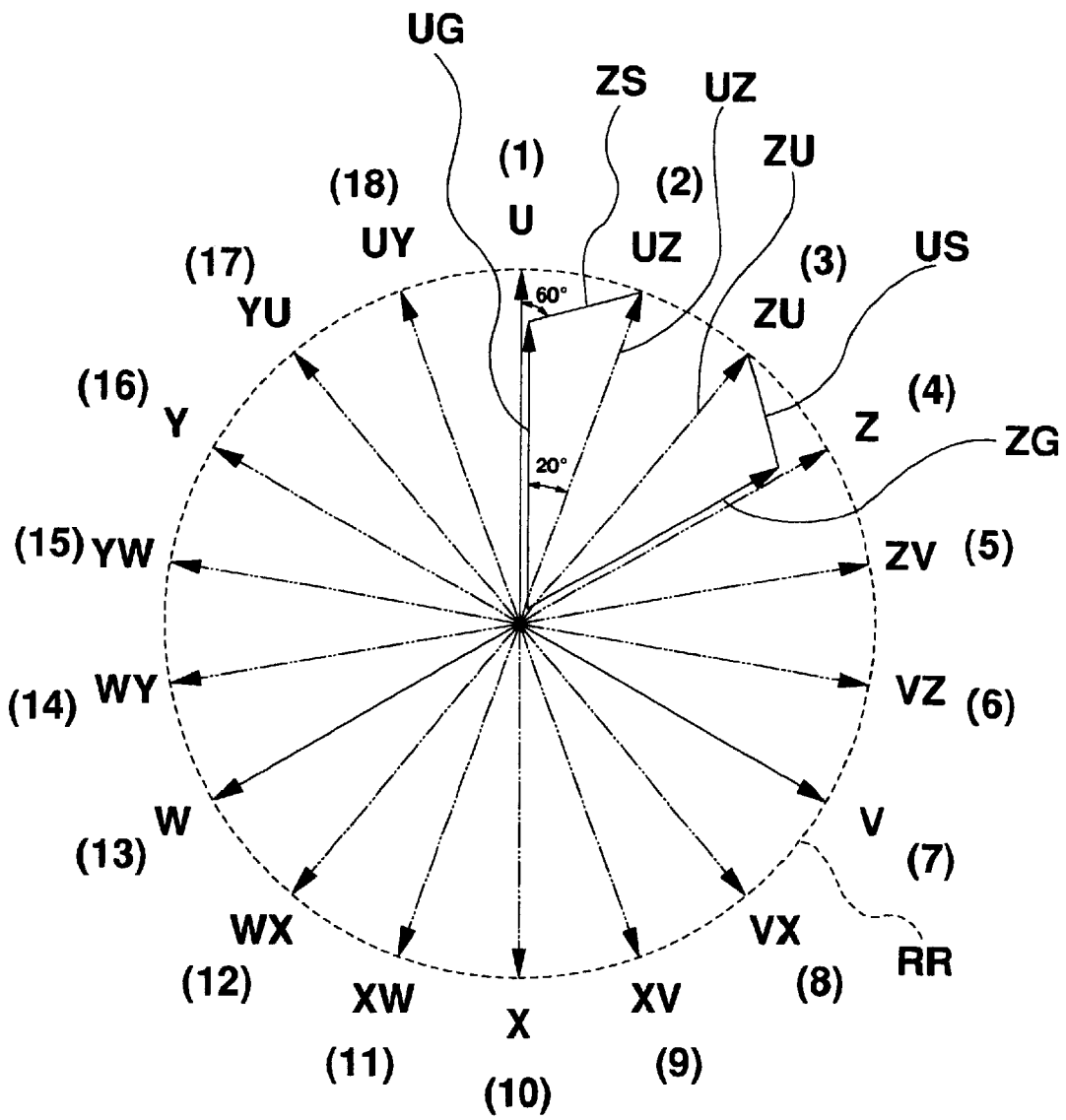
FIG. 13 is a current-phasor diagram of this invention based on the winding diagram of FIG. 12.

FIG. 13 shows a current-phasor diagram of this invention. The currents of each of the slots in an illustration wherein three-phase sinusoidal currents are passing through the three-phase windings are represented as phasor using electrical degrees in the figure. The three-phase sinusoidal currents of U phase, V phase, and W phase are applied to the slot 1, 7, 13. And the currents of X phase, Y phase, and Z phase passing in the reverse direction of U-phase, V-phase, and W-phase current respectively are applied to the slot 10, 16, 4. Combined current by applying currents of two phases is applied to the other slots through looping appropriate length of windings of two close phases within U phase, V phase, W phase, X phase, Y phase and Z phase.

Current phasor UZ of the slot 2 is, therefore, so determined as to have amplitude equivalent to the amplitude of the slot 1 and phase differed by 20° from the phase of the slot 1 through selecting the numbers of turns of U-phase windings and Z-phase winding appropriately. Since there is a phase difference of 60° between the Z phase and the U phase, the amplitude of the current phasor UG of components of the U phase may be calculated as (COS20°−SIN20°/TAN60°)=0.7422, and the amplitude of the current phasor ZS of components of the Z phase may be calculated as (SIN20°/SIN60°)=0.3949. As a result of this, current phasor of UZ phase looped through the slot 2 is produced through looping U-phase windings by the 0.7422-time number of turns as compared to the number of turns of the U-phase windings in the slot 1 and Z-phase windings by the 0.3949-time number of turns. The relationship between U phase and Z phase of the slot 3 is opposite to the relationship of the slot 2. Therefore, current phasor of ZU phase in the slot 3 is produced as composite phasor of the current phasor US and ZG through looping U-phase windings by the 0.3949-time number of turns as compared to the number of turns of U-phase windings in the slot 1 and Z-phase windings by the 0.7422-time number of turns of Z-phase windings in the slot 1. The phase and the number of turns in the slot 5, 6, 8, 9, and so on are determined in an analogous fashion. As before, a theoretically infinite number of combinations current phasor are provided by combinations of U phase, V phase, W phase, X phase, Y phase, and Z phase in addition to the combining method of current phasor described in FIG. 13 which is the simplest method. And every combining method is available for combining the current phasor of each of the slots.

Figure 14:
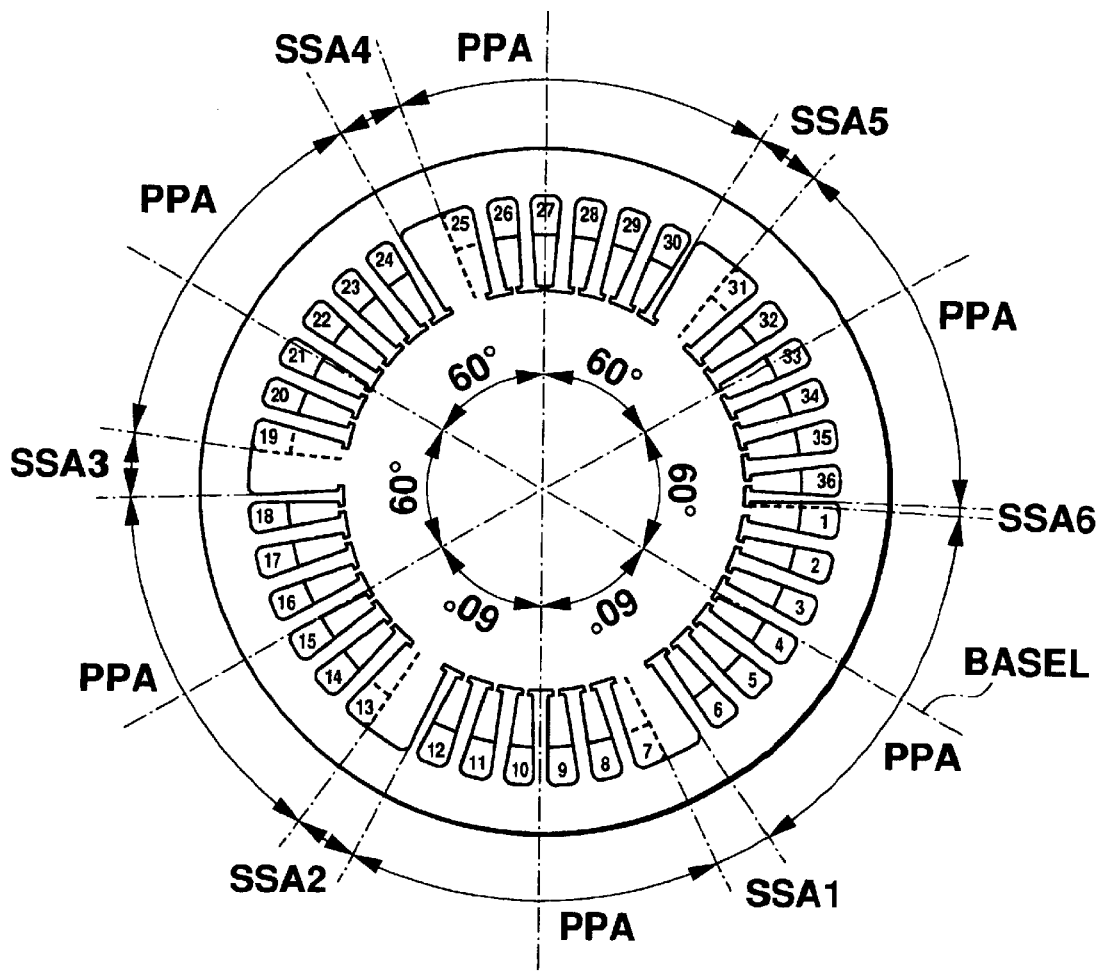
FIG. 14 is a sectional view of a stator of this invention.

Referring now to a method for reducing torque ripple through contrivance of stator construction, FIG. 14 shows an example of 3-phase 6-pole 36 slots. Six slots and six teeth are regarded as a function unit and represented by angles PPA thereof. Spaces between the function units are taken as SSA1, SSA2, SSA3, SSA4, SSA5, and SSA6 respectively in a clockwise direction CW with respect to the function unit constituted with slots from the slot 1 to the slot 6. A basic method for constructing the stator of FIG. 14 is as follows. Taking a centerline of the function unit including the slot 3 as BASEL, the center positions of function units in a clockwise direction CW are shifted by a ⅙-slot pitch, ⅖-slot pitch, ⅗-slot pitch, ⅘-slot pitch, and ⅚-slot pitch from centerlines divided by 60 degrees in the clockwise direction CW respectively. The construction mentioned here operates that electromagnetic operation between each of the function unit of the stator and the rotor works shifted by a ⅙-pitch with assuming the rotor has a six-pole symmetrical construction. This results in reducing the torque ripple in periods smaller than or equal to a 1-slot pitch, which generates similar operation and effects to the aforementioned method of shifting the position of each of the magnetic poles of the rotor.

An example of a specific angle of FIG. 14, assuming SSA6=0, is calculated as follows. As the function unit including the slot 33 is shifted in the clockwise direction CW by a ⅕-pitch against the function unit including the slot 3, PPA is derived as follows:

PPA=(60°−⅚ slot pitch)

Sifting of each of the function units by a ⅙-slot pitch, ⅖-slot pitch, ⅗-slot pitch, ⅘-slot pitch, and ⅚-slot pitch leads to followings:

360°=6×PPA+6 (slot pitch/6+PX)=360°−4×slot pitch+6× PX

∴PX=⅔×slot pitch

The perimeter of the stator of 360° corresponds to the number of slot pitches. As there is 36 slot pitches between 6×PPA and 6×(slot pitch/6+PX)=5×slot pitch, the sum is 41 slot pitches. In summary:

1 slot pitch=360°/141

SSA1=⅚×slot pitch=SSA2=SSA3=SSA4=SSA5

SSA6=0

PPA=(60°−⅚ slot pitch) SSA6 or PX using as initial values may be selected flexibly and applied with different values other than the value used in the aforementioned calculation.

The technique of selecting the amplitude and phase of current phasor appropriately in this invention described before may be applied to determine the number of turns of each of the slot of FIG. 14.

Figure 15:
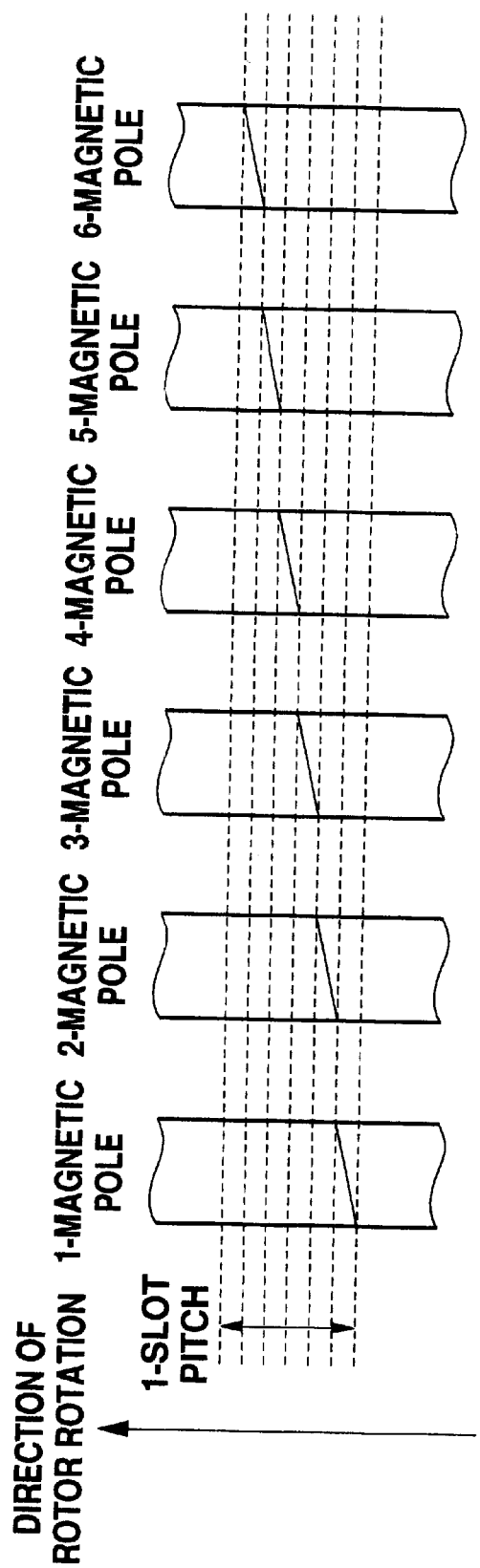
FIG. 15 is a drawing showing a relationship between shifting technology of magnetic poles of the rotor and skewing.

The effect of skewing on the rotor of the reluctance motor shown in FIG. 9 is described below. FIG. 15 is a drawing that centerlines of the magnetic poles located on positions where the shifting amount of the magnetic-pole center of each rotor is at 0°, 1.67°, 3.33°, 5°, 6.67°, and 8.33° on the perimeter are partially extracted and arranged in a lateral axis with skewing by a ⅙ slot pitch. Each of the magnetic poles is shifted by a ⅙ slot pitch and skewed by a ⅙ slot pitch further. As a result of this, 1 slot pitch is skewed geometrically through adding up the entire perimeter of the rotor as can be seen in FIG. 15. This leads to that the components of torque ripple smaller than or equal to 1-slot pitch are almost perfectly removed. It is therefore possible to favorably remove torque ripple without a disadvantage that components of magnetic flux in a direction of rotor axis are generated when a skewing angle is large because skewing is practically performed with only ⅙-slot pitch.

Another method for removing torque ripple in a period smaller than or equal to 1 slot pitch is described in the following, wherein the method is based on constructing a vernier relationship in which a discrete pitch of being discrete in the internal structure of the rotor is not an integral multiple of a slot pitch of the stator. In the relationship between the slots of the stator and divided magnetic paths in the proximity of a rotor surface shown in FIG. 10, for example, it can be seen that five divided magnetic paths are located between three slot pitches. This vernier method, which can not sufficiently reduce torque ripple, has an effect of reducing high harmonic contents especially. Therefore, using the method in conjunction with the aforementioned method of selecting the phase and amplitude of current phasor of each of the slots appropriately may reduce torque ripple almost perfectly.

Figure 16:
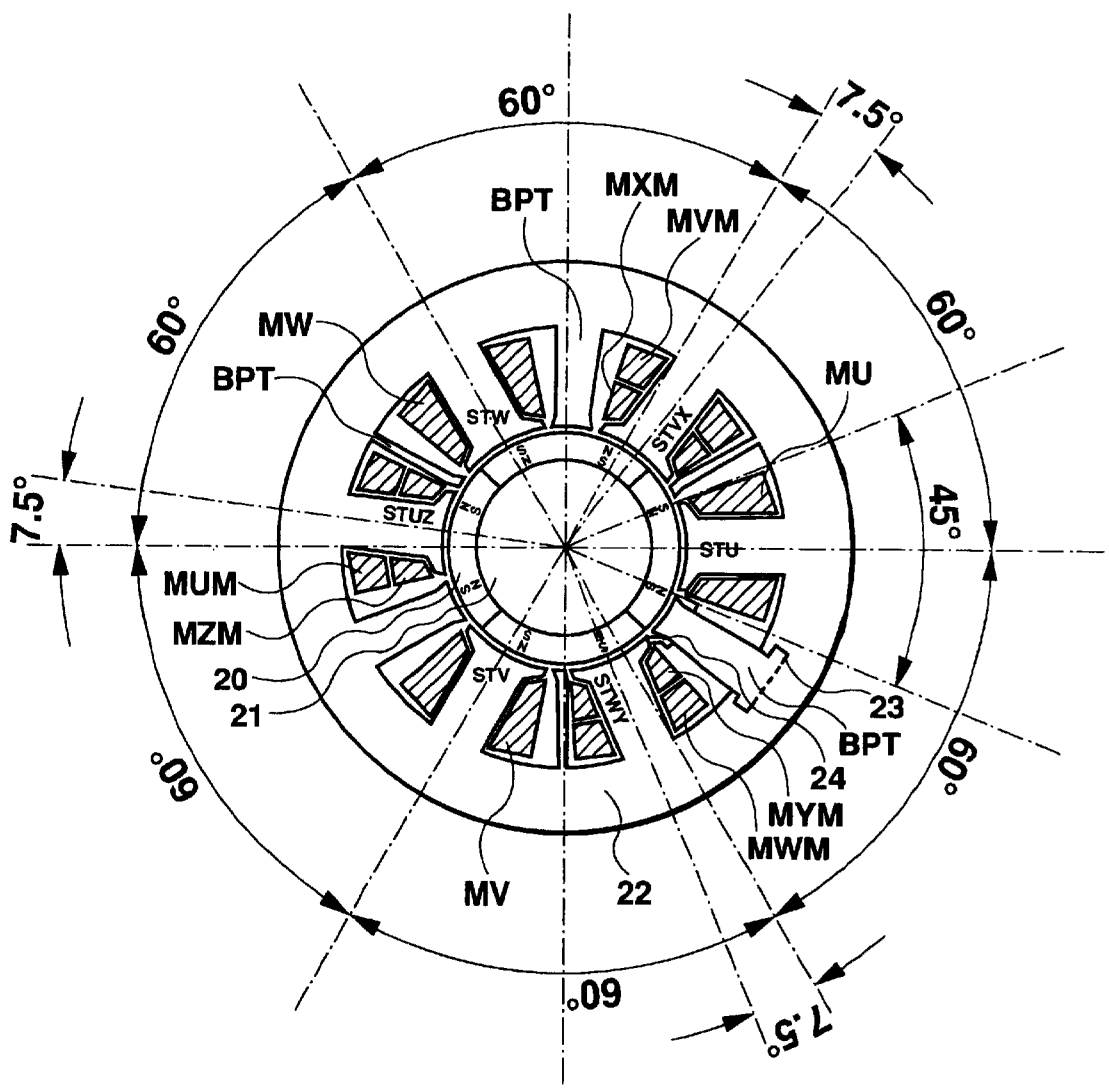
FIG. 16 is a sectional view of a permanent magnet synchronous motor comprising protruding poles of this invention.
Figure 17:
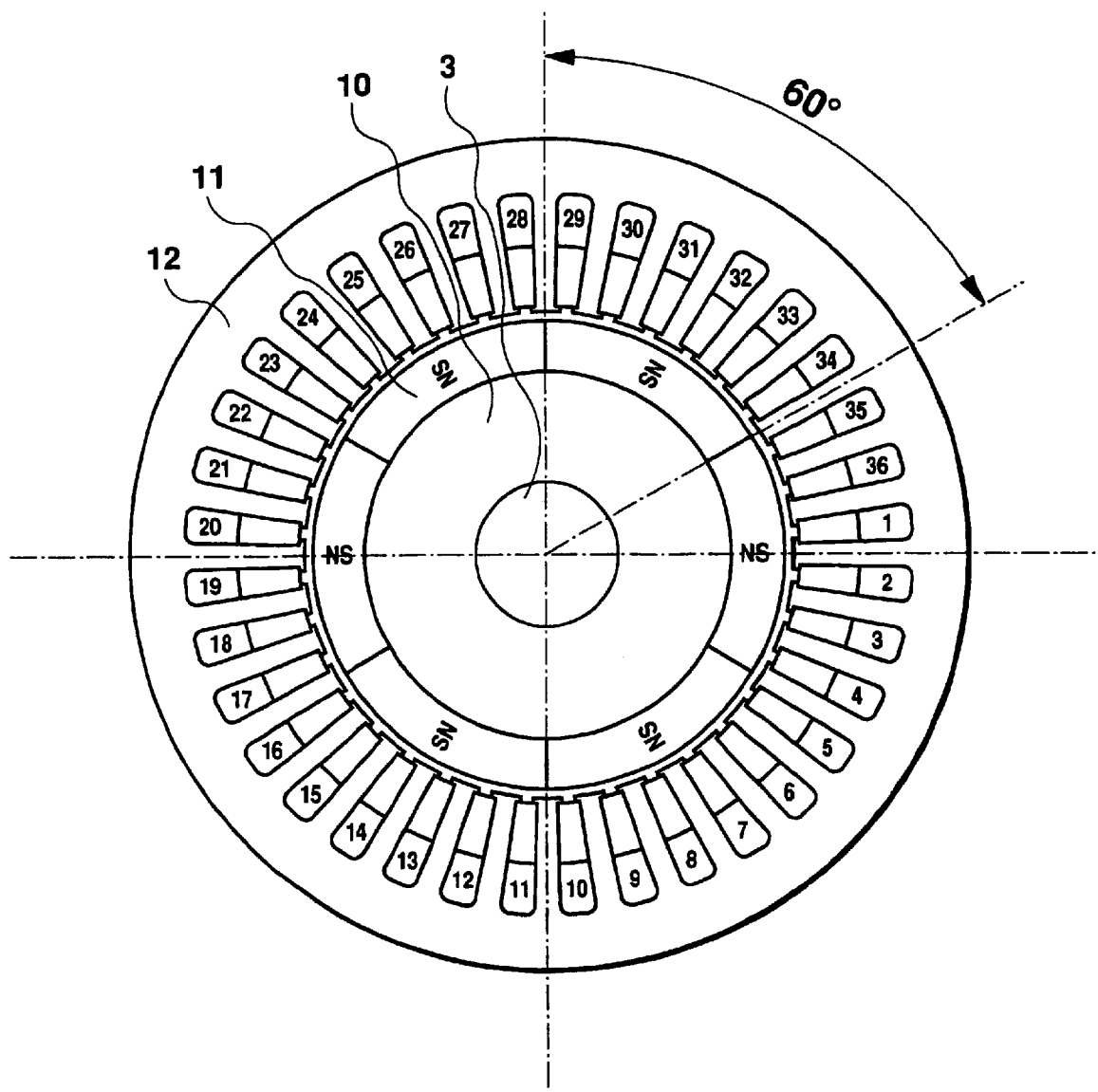
FIG. 17 is a sectional view of a motor of permanent magnet type of prior art.

Referring now to a permanent magnet synchronous motor having stator teeth of protruding pole type and windings shown in FIG. 16, this is a three-phase eight-pole motor. Permanent magnets 20 are mounted on a rotor 21 and eight-pole magnetic poles thereof are formed in ordered symmetrical shape. Either a structure that permanent magnets are mounted on the interior of the rotor or an electromagnet field adopting exciting windings instead of the permanent magnets may be applied as the construction of the rotor to achieve the same operation. Six teeth STU, STV, STW, STUZ, STVX, STWY are located on a stator 22. Positional relationship between the teeth STU, STV, STW is that they are located at 120° spacing in terms of mechanical degrees and also 120° spacing in terms of electrical degrees against the eight-pole rotor, and phases thereof are in order of the teeth STU, STY, STW when the rotor rotates in the clockwise direction CW. The tooth STUZ is located on the position proceeding by 187.5° in terms of mechanical degrees to the clockwise direction CW from the tooth STU and proceeding by 7.5°×4=30° in terms of electrical degrees to the clockwise direction CW in an operational aspect as a motor. The teeth STUZ, STVX, and STWY are located in relative relationship of 120° in terms of electrical degrees.

Windings MU, MV, and MW of being U phase, V phase, and W phase are singly looped through the teeth STU, STV, and STW respectively. A winding MUM of being a U-phase winding and a winding MZM of being a winding of Z phase and opposite phase of W phase are looped through the tooth STUZ. A winding MUM of being a V-phase winding and a winding MXM of being a winding of X phase and opposite phase of U phase are looped through the tooth STVX in an analogous fashion. A winding MWM of being a W-phase winding and a winding MYM of being a winding of V phase and opposite phase of Y phase are looped through the tooth STWX in an analogous fashion. And the width in a direction of rotor rotation of each of the teeth is almost equivalent to the width of a magnetic pole pitch. A magnetic path bypass BPT is located on each position between the teeth to guide a part of magnetic flux on the portion of the rotor locating between the teeth within the magnetic flux generated by the rotor through the magnetic path bypass BPT to a yoke portion. The magnetic flux exerts adverse operation such as passing partial magnetic flux through each of the teeth and yields detriments of decreasing the output torque of the motor.

The currents on each of the teeth and windings thereof is similar to the operation of current phasor shown in FIG. 5 when a three-phase sinusoidal current of U, V, and W phases is applied to the motor of FIG. 16. Teeth STU, STV, and STW and windings thereof correspond to the current phasor of U, V, and W of FIG. 5, while teeth STUZ, STVX, and STWY and windings thereof correspond to the current phasor of UZ, VX, WY of FIG. 5. In addition, the number of turns of windings MUM, MZM, MVM, MXM, MWM are necessary to be the 0.57735-time number of turns of the winding MUM just as in the case of FIG. 5. Consequently, the motor of FIG. 16 operates as that a six-phase sinusoidal current control was performed. The components of torque ripple in periods greater than the period of 30° in terms of electrical degrees and 7.5° in terms of mechanical degrees are removed and never existed in construction.

The permanent magnet motor comprising protruding structure of FIG. 16 is an example substantiating the construction that the phase and amplitude operates uniformly as operation of motor in current phasor operating on each of the teeth and may be capable of performing various modifications within the intent. The modifications include methods of, for example, increasing the number of the teeth in order to substantiate the current-phasor diagram of FIG. 13, using two phases and three phases simultaneously, and constructing a motor as a polyphase, being greater than or equal to four phases, motor and combinations of the methods or the like.

Methods for reducing the torque ripple in periods smaller than or equal to the period of 7.5° in terms of mechanical degrees and 30° in terms of electrical degrees are described below. A method is skewing the stator and the rotor by 7.5° in terms of mechanical degrees relatively. Almost all the torque ripple in periods smaller than or equal to the period of 7.5° in terms of mechanical degrees may be reduced through the skewing. Therefore, the torque ripple of the motor of FIG. 16 may be reduced almost perfectly through the skewing in conjunction with the effects of aforementioned technique.

In addition, construction of increasing the number of teeth in order to minimize the skewing angle as described in the current-phasor diagram of FIG. 13 makes the motor more effective because there is a disadvantage that a larger skewing angle decreases the output torque. On the contrary, the construction has a disadvantage of increasing the complexity of motor construction.

As other methods for reducing the torque ripple, there are methods of shifting the motor divided into two in an axial direction by 3.75° in terms of mechanical degrees relatively to a direction of rotor rotation, shifting the motor divided into three by 2.5° and devising magnetic-pole construction of the rotor to make a distribution in a direction of rotor rotation of magnetic flux on the rotor surface be sinusoidal.

Manufacturing aspects of the permanent magnet motor of FIG. 16 is described in the following. FIG. 16 shows the constitution required for electromagnetic operation as a motor. However, variations, such as dividing an iron core of the stator in order to make the winding work easier can be applied. An example of this is as follows. Each magnetic path bypass BPT is formed in a state as to be indicated by solid lines and broken lines 23 and isolated from the stator 22 in order to set spaces between adjacent teeth wide. Each magnetic path bypass BPT is mounted after looping each of the windings through a coil winder. A fixing member 24, which connects and braces the bypass of magnetic path BPT to the adjacent tooth when fixing strength of the magnetic path bypass is low, is preferable to be a non-magnetic substance.

A winding guide rod to lead the windings of the coil winder passes through the space between the teeth at the winding work under normal circumstances. Therefore, setting the spaces between the teeth wide allows a high-speed winding work. Winding at high densities by a more precise winding work may be achieved using the increased flexibility of the work.

Although this invention has been described using certain examples, application, combination, and modification in changing the number of phases, poles, and slots of the motor are possible and are embraced by this invention.

According to this invention, the torque ripple in various periods of the motor may be reduced through each of the techniques or through any workable combination of the techniques. This results in achieving precise control and decreasing vibrations and noises. The tradeoff between improvements of various kinds of performance and an increase of torque ripple is often encountered in designing a motor and technology for reducing torque ripple regardless of the internal construction of a rotor provides effects that designing flexibility of a motor extensively increases and improvements of motor performances is substantiated. In addition, this invention may be applied almost all the types of motors such as a permanent magnet synchronous motor, reluctance motor, and induction motor.

Moreover, by allowing the magnetic path bypass BPT to be mounted after the winding work in a permanent magnet synchronous motor having protruding poles, productivity of the motor may be increased and windings may be produced at higher densities. The use of high-density windings increases the output torque.

What is claimed is:

1. A torque ripple-reduced alternating-current motor, comprising:

a plurality of slots for arranging a winding on a stator, the slots being located on the circumference of the stator, wherein a winding of each phase is looped through each of the slots so that the product of the number of turns in one of the slots on the stator and the current is the phase and amplitude of a current phasor represented by amperes and the number of turns and becomes almost equal to the product in each of the other slots when a polyphase sinusoidal alternating current having a number of phases equal to a number of phases of the motor is applied;

a plurality of teeth on the stator, wherein a position in a direction of rotor rotation of each of the teeth is uniformly located on an inner radius of the stator and the slots are formed to have an area relationship such that a cross-sectional area of each of the slots is roughly proportional to the amount of windings in each of the slots; and a rotor comprising a plurality of magnetic poles, including north poles and south poles, placed such that a position in a direction of rotor rotation of each of the magnetic poles is shifted to the direction of rotor rotation by NN/NR of a 1-slot pitch against a position located on an equivalent spacing, wherein NR is an integer equal to the numbers of magnetic poles on the rotor and NN is an integer between 1 and NR−1.

2. The motor according to claim 1, wherein said rotor and said stator are relatively skewed by an angle smaller than or equal to one half of the slot pitch.

3. The motor according to claim 1, wherein an internal structure of each magnetic pole of the rotor is electrically discrete, and a vernier relationship of a discrete pitch of the internal structure of the rotor is not an integral multiple of a slot pitch of the stator.

4. The motor according to claim 1, wherein the north poles and the south poles are located successively in a direction of rotor rotation on the perimeter of the rotor and a boundary position between each north pole and each south pole is shifted in a direction of rotor rotation by NN/NR of a 1-slot pitch of the stator against a position located on an equivalent spacing.

5. The motor according to claim 2, wherein the north poles and the south poles are located successively in a direction of rotor rotation on the perimeter of the rotor and a boundary position between each magnetic north pole and each magnetic south pole is shifted to a direction of rotor rotation by NN/NR of a 1-slot pitch of the stator against a position located on an equivalent spacing.

6. A torque-ripple-reduced NB-phase permanent magnet synchronous motor, comprising:

a stator including a protruding structure, wherein a single winding of the stator is looped through a single tooth, a number of stator teeth is greater than or equal to (NB+2), each of the teeth of the stator has a composite winding looped by windings of two or more phases, a position in a direction of rotor rotation of each of the teeth of the stator is arranged on the circumference of the stator at positions $AE_{i(i=1,\ldots,N)}$ in terms of electrical degrees where different phases of greater than or equal to (NB+2) are located, the amplitude of current phasor of each of the teeth is roughly equal when the entire sum of current phasor of a winding looped through each of the teeth of the stator is represented as current phasor of each of the teeth, a direction of each of said current phasor is roughly coincident with a phase in terms of electrical degrees of positions $AE_{i(i=1,\ldots,N)}$ in terms of electrical degrees in a direction of rotor rotation where each of the teeth is located, N is the number of teeth, taking a position in a direction of rotor rotation of each of the teeth of the stator as AE in terms of electrical degrees, the electrical degrees AE or (AE−180°) of each of the teeth is located at a position equally divided by the number of an integer NSK between 0° and 180° and the rotor and the stator are relatively skewed by an angle roughly equal to (180°/NSK) or an angle being an integral multiple of the (180°/NSK).

* * * * *